US012650746B2

(12) United States Patent
Shi et al.

(10) Patent No.: US 12,650,746 B2
(45) Date of Patent: *Jun. 9, 2026**

(54) TOUCH DISPLAY DEVICE

(71) Applicants:Beijing BOE Optoelectronics Technology Co., Ltd., Beijing (CN); BOE Technology Group Co., Ltd., Beijing (CN)

(72) Inventors: Lei Shi, Beijing (CN); Hao Yan, Beijing (CN); Yashuai An, Beijing (CN); Yong Zhang, Beijing (CN); Jian Wang, Beijing (CN); Xian Wang, Beijing (CN); Yang Ge, Beijing (CN); Jianwei Ma, Beijing (CN); Xingxing Guan, Beijing (CN); Wulin Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/093,700

(22) Filed: Mar. 28, 2025

(65) Prior Publication Data

US 2025/0224830 A1    Jul. 10, 2025

Related U.S. Application Data

(63) Continuation of application No. 18/273,717, filed as application No. PCT/CN2022/096463 on May 31, 2022, now Pat. No. 12,307,042.

(51) Int. Cl.
*G06F 3/041* (2006.01)

(52) U.S. Cl.
CPC ........ *G06F 3/04164* (2019.05); *G06F 3/0412* (2013.01)

(58) Field of Classification Search
None
See application file for complete search history.

(56) References Cited

U.S. PATENT DOCUMENTS

| | | | |
|---|---|---|---|
| 2018/0033806 A1* | 2/2018 | Long | H10D 86/60 |
| 2020/0333909 A1* | 10/2020 | Chen | G06F 3/0412 |
| 2022/0189377 A1* | 6/2022 | Wang | G09G 3/3266 |
| 2024/0045545 A1* | 2/2024 | Xu | G06F 3/041 |

* cited by examiner

*Primary Examiner* — Krishna P Neupane
(74) *Attorney, Agent, or Firm* — Banner & Witcoff, Ltd.

(57) ABSTRACT

The disclosure provides a touch display device including a display region and a peripheral region, a touch signal line, and a first data signal line. The peripheral region has a touch pin and a first data pin; the touch signal line includes a touch signal main line in the display region, and a touch signal lead wire in the peripheral region and connecting the touch signal main line to the touch pin, the touch signal main line and the touch signal lead wire are in a first conductive layer and directly connected to each other; the first data signal line includes a first data signal main line in the display region and a first data signal lead wire in the peripheral region, the first data signal main line is connected to the first data pin through the first data signal lead wire in a second conductive layer.

20 Claims, 13 Drawing Sheets

TOUCH DISPLAY DEVICE

CROSS REFERENCE TO RELATED APPLICATIONS

This application is a continuation application of U.S. application Ser. No. 18/273,717, filed on Jul. 21, 2023, which is a U.S. National Phase Entry of International Application No. PCT/CN2022/096463, filed on May 31, 2022, designating the United States of America. The present application claims priority to and the benefit of the above-identified applications and the above-identified applications are incorporated by reference herein in their entirety.

TECHNICAL FIELD

The embodiments of the present disclosure relate to a touch display device.

BACKGROUND

Touch screens are everywhere around us. Touch screens save space and are easy to carry, and have better human-computer interaction. Touch and display driver integration (TDDI) technology is a technology that integrates display and touch functions into an integrated module, during the designation of TDDI, not only the display function is realized, but also the touch function is realized. In traditional TDDI products, the array substrate includes a plurality of data signal lines and a plurality of touch signal lines, wiring lines of the touch signal lines are connected to each other and connected to the integrated circuit through vias. However, conductive material tends to have sharp corners at the corners of the vias, which may lead to the disconnection of the conductive material, resulting in reloaded grid and affecting the display of the product.

SUMMARY

At least one embodiment of the present disclosure provides a touch display device, which includes: a display region and a peripheral region, wherein the peripheral region is located on a side of the display region, and first pins and second pins are located in the peripheral region, the first pins include a touch pin, and the second pins includes a first data pin; a touch signal line and a substrate, wherein the touch signal line is located above the substrate, the touch signal line includes a touch signal main line and a touch signal lead wire, the touch signal main line is located in the display region and extending along a first direction, the touch signal lead wire is located in the peripheral region and connecting the touch signal main line to the touch pin, and the touch signal main line and the touch signal lead wire are both located in a first conductive layer and are directly connected to each other; and a first data signal line, wherein the first data signal line includes a first data signal main line located in the display region and a first data signal lead wire located in the peripheral region, wherein the first data signal main line is connected to the first data pin through the first data signal lead wire, and the first data signal lead wire is located in a second conductive layer different from the first conductive layer.

In the touch display device provided by at least one embodiment of the disclosure, the peripheral region includes at least one group of first grouped signal lead wires composed of the touch signal lead wire and the first data signal lead wire, the first grouped signal lead wires includes the touch signal lead wire and the first data signal lead wire being wired to be overlapped with each other in a direction perpendicular to a main surface of the substrate, or includes the touch signal lead wire and the first data signal lead wire being wired to be not overlapped in the direction perpendicular to the main surface of the substrate, but adjacent to each other in a direction parallel to the main surface of the substrate.

In the touch display device provided by at least one embodiment of the disclosure, the second pins further include a second data pin and a third data pin, and the touch display device further includes: a second data signal line, including a second data signal main line located in the display region and a second data signal lead wire located in the peripheral region, wherein the second data signal main line is connected to the second data pin through the second data signal lead wire; and a third data signal line, including a third data signal main line located in the display region and a third data signal lead wire located in the peripheral region, wherein the third data signal main line is connected to the third data pin through the third data signal lead wire.

The touch display device provided by at least one embodiment of the disclosure, in the peripheral region, further includes at least one group of second grouped signal lead wires composed of the second data signal lead wire and the third data signal lead wire, the second grouped signal lead wires include the second data signal lead wire and the third data signal lead wire being wired to be overlapped with each other in the direction perpendicular to the main surface of the substrate, or include the second data signal lead wire and the third data signal lead wire being wired to be not overlapped in the direction perpendicular to the main surface of the substrate, but adjacent to each other in the direction parallel to the main surface of the substrate.

Touch display device provided by at least one embodiment of the disclosure, further includes a first electrostatic discharge unit, a second electrostatic discharge unit and an electrostatic discharge signal line that are located in a boundary region of the peripheral region close to the display region, the electrostatic discharge signal line extends along a second direction intersecting the first direction, the second data signal line is connected to the first electrostatic discharge unit, the third data signal line is connected to the second electrostatic discharge unit, wherein each of the first electrostatic discharge unit and the second electrostatic discharge unit includes a transistor, and at least one transistor in the first electrostatic discharge unit and at least one transistor in the second electrostatic discharge unit are disposed on opposite sides of the electrostatic discharge signal line in the first direction.

In the touch display device provided by at least one embodiment of the disclosure, the third data signal main line and the third data signal lead wire are connected to each other through a via structure, the via structure is also disposed in the boundary region and is disposed on a side of the first electrostatic discharge unit and the second electrostatic discharge unit away from the display region, and the at least one transistor of the first electrostatic discharge unit, the at least one transistor of the second electrostatic discharge unit, and the via structure are disposed between the second data signal main line and the third data signal main line that are adjacent to each other in the second direction, and are overlapped with each other in the first direction.

In the touch display device provided by at least one embodiment of the disclosure, the touch pin, the first data pin, the second data pin and the third data pin are arranged along the first direction, and are disposed adjacent to each other along a second direction intersecting the first direction, wherein distances from the first data pin, the second data pin and the third data pin to the touch pin in the second direction increase sequentially.

In the touch display device provided by at least one embodiment of the disclosure, the first data signal main line and the first data signal lead wire of the first data signal line are located in a same conductive layer or in different conductive layers, and a data signal main line and a data signal lead wire of at least one of the second data signal line and the third data signal line are located in different layers and connected to each other through a via structure.

In the touch display device provided by at least one embodiment of the disclosure, the first data signal main line and the first data signal lead wire are located in different conductive layers and connected to each other through a first via structure.

In the touch display device provided by at least one embodiment of the disclosure, the first data signal main line is located in the first conductive layer, the first via structure extends through an insulating layer between the first conductive layer and the second conductive layer, to connect the first data signal main line to the first data signal lead wire.

In the touch display device provided by at least one embodiment of the disclosure, the first data signal main line is located in a third conductive layer different from the first conductive layer and the second conductive layer, the first via structure extends through an insulating layer between the second conductive layer and the third conductive layer, to connect the first data signal main line to the first data signal lead wire.

In the touch display device provided by at least one embodiment of the disclosure, the first data signal main line is located in the second conductive layer, and is directly connected to the first data signal lead wire.

In the touch display device provided by at least one embodiment of the disclosure, the first pins include a plurality of touch pins arranged in a row along a second direction intersecting the first direction and at least one dummy pin region, each of the at least one dummy pin region includes a dummy pin or dummy pins, disposed aside the plurality of touch pins in the second direction, and a number of the dummy pin or dummy pins included in each of the at least one dummy pin region is N, and N≥1.

In the touch display device provided by at least one embodiment of the disclosure, one of the at least one dummy pin region includes N dummy pins, and N is an even number, wherein the N dummy pins are arranged consecutively in the second direction, and all of the N dummy pins are not connected to signal lead wires.

The touch display device provided by at least one embodiment of the disclosure, further includes a dummy touch signal line, the dummy touch signal line includes a dummy touch signal main line located in the display region and a dummy touch signal lead wire located in the peripheral region, and the dummy touch signal main line and the dummy touch signal lead wire are isolated from each other, wherein the at least one dummy pin region includes a first dummy pin region, and one dummy pin included in the first dummy pin region is connected to the dummy touch signal lead wire.

The touch display device provided by at least one embodiment of the disclosure, further includes a fourth data signal line, and the second pins further includes a fourth data pin, the fourth data signal line includes a fourth data signal main line located in the display region and a fourth data signal lead wire located in the peripheral region, wherein the fourth data signal main line is connected to the fourth data pin through the fourth data signal lead wire, wherein in the peripheral region, at least one group of grouped signal lead wires constituted by the fourth data signal lead wire and the dummy touch signal lead wire is included, the grouped signal lead wires include the fourth data signal lead wire and the dummy touch signal lead wire being wired to be overlapped with each other in a direction perpendicular to a main surface of the substrate, or include the fourth data signal lead wire and the dummy touch signal lead wire being wired to be not overlapped in the direction perpendicular to the main surface of the substrate, but adjacent to each other in a direction parallel to the main surface of the substrate.

The touch display device provided by at least one embodiment of the disclosure, further includes a third electrostatic discharge unit and an electrostatic discharge signal line that are located in a boundary region of the peripheral region close to the display region, wherein the electrostatic discharge signal line extends along the second direction, the fourth data signal line is connected to the third electrostatic discharge unit, wherein the third electrostatic discharge unit includes at least one transistor, and one of the at least one transistor is disposed on a side of the electrostatic discharge signal line in the first direction, and another one of the at least one transistor is overlapped with the electrostatic discharge signal line in the direction perpendicular to the main surface of the substrate.

In the touch display device provided by at least one embodiment of the disclosure, the fourth data signal main line and the fourth data signal lead wire are connected to each other through a via structure, the via structure is also disposed in the boundary region and is disposed on a side of the third electrostatic discharge unit away from the display region, and the at least one transistor in the third electrostatic discharge unit is overlapped with the via structure in the first direction.

In the touch display device provided by at least one embodiment of the disclosure, a number N of the dummy pin or dummy pins included in the first dummy pin region is an odd number, and the one dummy pin is an N-th dummy pin counted from a dummy pin closest to the touch pins along the second direction.

The touch display device provided by at least one embodiment of the disclosure, further includes a common electrode busline, wherein the dummy touch main line is connected to the common electrode busline.

In the touch display device provided by at least one embodiment of the disclosure, the second pins further include a first sub-pin, a second sub-pin and a third sub-pin disposed corresponding to each of the dummy pin or the dummy pins, each of the dummy pin or the dummy pins and the first sub-pin, the second sub-pin and the third sub-pin are arranged along the first direction, and adjacent to each other in the second direction, wherein distances from the first sub-pin, the second sub-pin and the third sub-pin to a corresponding dummy pin increase sequentially in the second direction.

In the touch display device provided by at least one embodiment of the disclosure, the dummy pins include a first dummy pin and a second dummy pin adjacent to each other in the second direction, the first sub-pin and the second sub-pin corresponding to the first dummy pin are respectively connected to two data signal lead wires in a third grouped signal lead wires, the third sub-pin corresponding to the first dummy pin and the first sub-pin corresponding to the second dummy pin are respectively connected to two data signal lead wires in a fourth grouped signal lead wires, wherein the two data signal lead wires included in each of the third grouped signal lead wires and the fourth grouped signal lead wires are overlapped with each other in a direction perpendicular to a main surface of the substrate, or are not overlapped in the direction perpendicular to the main surface of the substrate but are adjacent to each other in a direction parallel to the main surface of the substrate.

In the touch display device provided by at least one embodiment of the disclosure, the second sub-pin and the third sub-pin corresponding to the second dummy pin are respectively connected to two data signal lead wires in a fifth grouped signal lead wires, the fifth grouped signal lead wires are overlapped with each other in the direction perpendicular to the main surface of the substrate, or the fifth grouped signal lead wires are not overlapped with each other in the direction perpendicular to the main surface of the substrate but are adjacent to each other in the direction parallel to the main surface of the substrate.

In the touch display device provided by at least one embodiment of the disclosure, the first dummy pin is an m-th dummy pin and not an N-th dummy pin counted along the second direction from a dummy pin closest to the touch pins among the dummy pins included in one of the at least one dummy pin region, the second dummy pin is an (m+1)-th dummy pin adjacent to the m-th dummy pin in the second direction, where m is an odd number.

The touch display device provided by at least one embodiment of the disclosure, further includes a transistor disposed in the display region and connected to the data signal line, the transistor includes a gate electrode and source and drain electrodes, wherein the source and drain electrodes are located in the first conductive layer, and the gate electrode is located in the second conductive layer; or the source and drain electrodes are located in the second conductive layer, and the gate electrode is located in a third conductive layer different from the first conductive layer and the second conductive layer.

The touch display device provided by at least one embodiment of the disclosure, further includes a fourth electrostatic discharge unit, a fifth electrostatic discharge unit and an electrostatic discharge signal line that are located in a boundary region of the peripheral region close to the display region, the electrostatic discharge signal line extends along a second direction intersecting the first direction, the first data signal line is connected to the fourth electrostatic discharge unit, the touch signal line is connected to the fifth electrostatic discharge unit, wherein each of the fourth electrostatic discharge unit and the fifth electrostatic discharge unit includes a transistor, and at least one transistor in the fourth electrostatic discharge unit and at least one transistor in the fifth electrostatic discharge unit are disposed on opposite sides of the electrostatic discharge signal line in the first direction.

In the touch display device provided by at least one embodiment of the disclosure, the first data signal main line and the first data signal lead wire of the first data signal line are connected to each other through a via structure, the via structure is also disposed in the boundary region and is disposed on a side of the fourth electrostatic discharge unit and the fifth electrostatic discharge unit away from the display region, and the at least one transistor in the fourth electrostatic discharge unit, the at least one transistor in the fifth electrostatic discharge unit, and the via structure are disposed between the first data signal line and the touch signal line that are adjacent to each other in the second direction, and are overlapped with each other in the first direction.

At least one embodiment of the disclosure provides a touch display device, which includes: a display region and a peripheral region, the peripheral region is located on a side of the display region, and a plurality of first pins and a plurality of second pins arranged along a first direction are disposed in the peripheral region, the plurality of first pins include a plurality of touch pins arranged in one or more rows along a second direction intersecting the first direction, the plurality of second pins include a plurality of data pins arranged in one or more rows along the second direction; a plurality of touch signal lines, located above the substrate, and extending from the display region to the peripheral region, to be directly connected to the plurality of touch pins, and each of the plurality of touch signal lines includes a touch signal main line located in the display region and a touch signal lead wire located in the peripheral region, wherein the touch signal main lines and the touch signal lead wires of the plurality of touch signal lines and the plurality of touch pins are located in a same first conductive layer, and the plurality of touch signal lines are directly connected to the plurality of touch pins; a plurality of data signal lines, located above the substrate and connected to the plurality of data pins; wherein a plurality of first data signal lines among the plurality of data signal lines respectively include first data signal main lines and first data signal lead wires connected to each other, the first data signal main lines are located in the display region, and the first data signal lead wires are located in the peripheral region and connecting the first data signal main lines to first data pins of the plurality of data pins, the first data signal main lines are located in a conductive layer different from a conductive layer where the first data signal lead wires are located; a plurality of second data signal lines among the plurality of data signal lines respectively include second data signal main lines and second data signal lead wires connected to each other, the second data signal main lines are located in the display region, and second data signal lead wires are located in the peripheral region and connecting the second data signal main lines to second data pins of the plurality of data pins, all of the second data signal lead wires and the second data signal main lines are located in a same conductive layer.

In the touch display device provided by at least one embodiment of the disclosure, the plurality of first pins further include at least one dummy pin region disposed on a side of at least one of the plurality of touch pins in the second direction, and the at least one dummy pin region includes at least one dummy pin, a number of the at least one dummy pin is N, and N≥1.

In the touch display device provided by at least one embodiment of the disclosure, a ratio of a number of the plurality of touch signal lines to a number of the plurality of data signal lines is smaller than a ratio of a number of rows of the plurality of first pins to a number of rows of the plurality of second pins.

BRIEF DESCRIPTION OF THE DRAWINGS

In order to clearly illustrate the technical solution of the embodiments of the present disclosure, the drawings of the embodiments will be briefly described. It is obvious that the described drawings in the following are only related to some embodiments of the present disclosure and thus are not construed as any limitation to the present disclosure.

DETAILED DESCRIPTION

In order to make objectives, technical details, and advantages of the embodiments of the present disclosure clearer, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first", "second", etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

In various embodiments of the present disclosure, the touch signal lines of the touch display device extend in the display region and the peripheral region, and are directly connected to touch pins of an integrated circuit without going through a via, in this way, breakage of conductive material due to via can be avoided, furthermore, display issues caused by the breakage of conductive material can be avoided. On the other hand, since the touch signal line is not connected through via, the resistance of the touch signal line can be reduced, furthermore, yield rate can be effectively improved, and power consumption of a product can be reduced. In addition, on the basis of directly connecting the touch signal line with the integrated circuit, the embodiment of the present disclosure further optimizes a wiring mode of the touch signal lines and the data signal lines, through which the wiring space can be saved more, the peripheral region is made narrower, thereby realizing a narrower lower bezel of the device.

Figure 1:
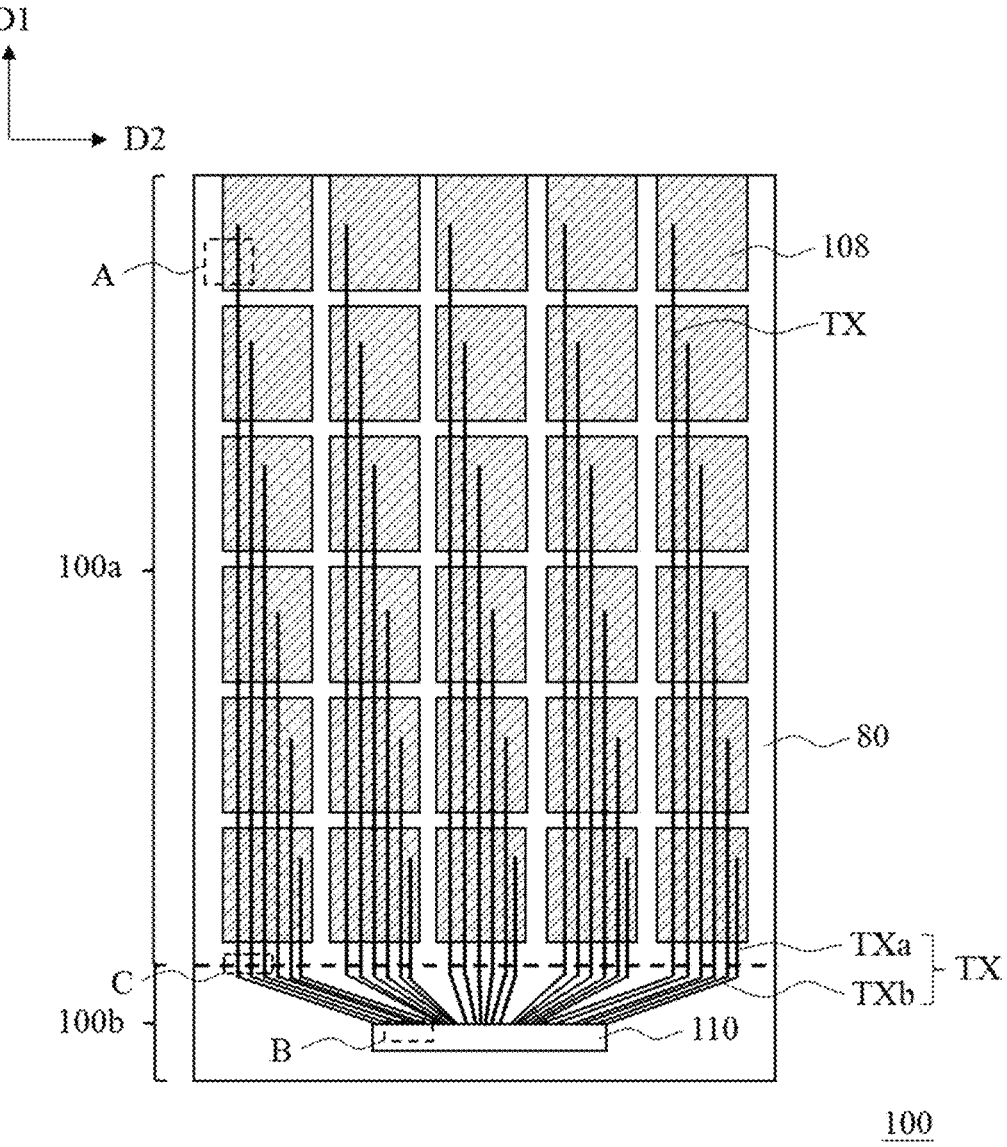
FIG. 1 illustrates a schematic plan view of a touch display device according to some embodiments of the present disclosure.

FIG. 1 illustrates a schematic plan view of a display device according to some embodiments of the present disclosure.

Referring to FIG. 1, the display device 100 includes a display region 100*a* and a peripheral region 100*b*. In some embodiments, the display device 100 is a touch display device, and for example, the display device 100 can be applied to TDDI products. In the display region 100*a*, a plurality of touch electrodes 108 disposed on a substrate 80 are provided, the plurality of touch electrodes 108 are disposed in an array along a direction D1 and a direction D2 parallel to the substrate 80, for example. The direction D1 and the direction D2 are intersected with each other, for example, perpendicular to each other, and may be referred to as a first direction and a second direction, respectively, or vice versa. A plurality of touch signal lines TX are disposed corresponding to the plurality of touch electrodes 108, and each of the touch signal lines TX is connected to a corresponding touch electrode 108, for example, through a via (not shown). It should be understood that, numbers of the touch electrodes 108 and the touch signal lines TX shown in the figure are only for illustration, and the present disclosure is not limited thereto.

In some embodiments, the touch signal lines TX continuously extend from the display region 100*a* to the peripheral region 100*b* and are connected to an integrated circuit (IC) 110 disposed in the peripheral region 100*b*. The peripheral region 100*b* may include, for example, a boundary region, a fan-out region, and a bonding region. The fan-out region is, for example, a region where the signal lines are distributed in a fan-shape, as shown in FIG. 1, the boundary region is located between the display region 100*a* and the fan-out region, and the bonding region is a region for bonding signal lines and the IC. In some embodiments, the signal lines extend from the display region to the boundary region, then pass through the fan-out region and reach the bonding region, so as to be connected to the IC. The integrated circuit 110 includes control/driving circuits for controlling/driving various signal lines in the display region 100*a*. In some embodiments, each of the touch signal lines TX includes a touch signal main line TXa located in the display region 100*a* and a touch signal lead wire TXb located in the peripheral region 100*b*. The touch signal main line Txa, for example, extends along the direction D1, and the touch signal lead wire TXb, for example, extends along a direction intersecting with the direction D1. The touch signal main line TXa is electrically connected to the integrated circuit 110 through the touch signal lead wire TXb. In some embodiments, the touch signal main line TXa and the touch signal lead wire TXb are located in a same conductive layer, and is a continuous conductive strip, that is, the touch signal main line TXa is directly connected to the touch signal lead wire TXb without passing through a via, and there may be no obvious interface between the touch signal main line TXa and the touch signal lead wire TXb. In some embodiments, the touch signal line TX is also directly connected to the integrated circuit 110 (for example, a pin in the integrated circuit) without passing through a via.

Figure 2A:
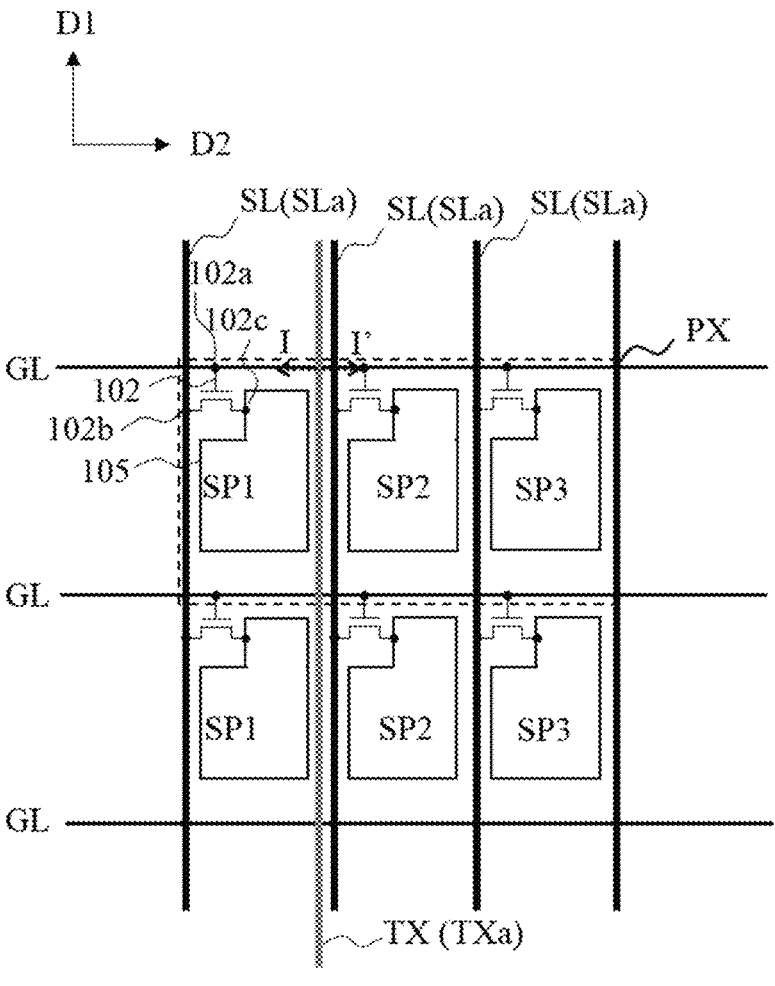
FIG. 2A illustrates a schematic view of a region A in a display region of the touch display device shown in FIG. 1 according to some embodiments of the present disclosure.
Figure 3A:
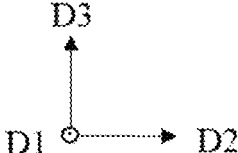
FIG. 3A illustrates a schematic cross-sectional view taken along a line I-I' of FIG. 2A according to some embodiments of the present disclosure.
Figure 3A:
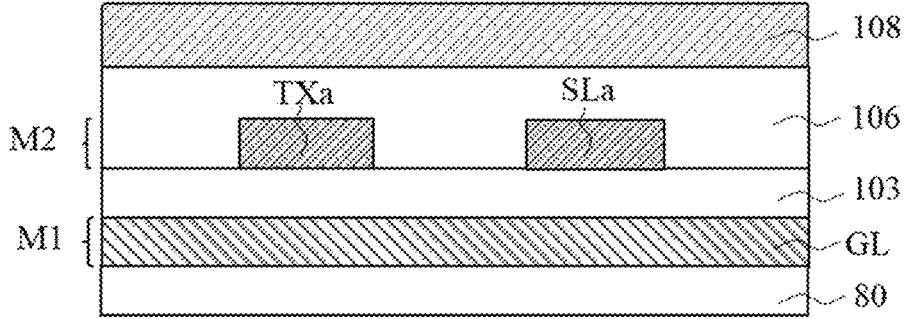

FIG. 2A illustrates a schematic view of a region A in the display region of the display device 100 shown in FIG. 1 according to some embodiments of the present disclosure. FIG. 3A illustrates a schematic cross-sectional view taken along a line I-I' of FIG. 2A according to some embodiments of the present disclosure.

Referring to FIG. 1 and FIG. 2A, a plurality of gate lines GL and a plurality of data signal lines SL are further disposed in the display region 100a; in some embodiments, the plurality of gate lines GL extend along the direction D2 and are arranged along the direction D1; the plurality of data signal lines SL extend along the direction D1 and are arranged along the direction D2, the plurality of data signal lines SL are, for example, source lines. The plurality of gate lines GL and the plurality of data signal lines SL are crossed with each other to define a plurality of pixel regions PX. For example, a plurality of pixel regions PX arranged in an array along the direction D1 and the direction D2 are disposed in the display region 100a, and each of the plurality of pixel regions PX may include one or more sub-pixel regions, for example, include sub-pixel regions SP1, SP2, SP3. Each of sub-pixel regions SP1 to SP3 is defined by adjacent gate lines GL and adjacent data signal lines SL that are crossed with each other. The plurality of sub-pixel regions SP1, SP2, and SP3 included in the pixel region PX may be pixel regions for displaying different colors (e.g., red, green, and blue). It should be understood that, a number of pixel regions PX and a number of sub-pixel regions included in each pixel region PX shown in FIG. 2A are only for illustration, and the present disclosure does not limit the number of the pixel regions PX and the number of the sub-pixel regions included in each pixel region PX.

In some examples, a switching element 102 and a pixel electrode 105 are disposed in each of the sub-pixel regions. The switching element 102 may be or includes a thin film transistor (TFT), and includes a first electrode 102a, a second electrode 102b and a third electrode 102c. In some embodiments, the first electrode 102a (for example, a gate electrode G) of the switching element 102 is connected to a gate line GL, the second electrode 102b (for example, a source electrode S or a drain electrode D) is connected to a data signal line SL, and the third electrode 102c (for example, a drain electrode D or a source electrode S) is connected to the pixel electrode 105. The touch electrodes 108 are disposed corresponding to the pixel electrodes 105, in some embodiments, the touch electrodes 108 are multiplexed as common electrodes (Vcom), in a display stage, the touch electrodes TX are used as common electrodes, and electric fields are formed between the touch electrodes TX and the pixel electrodes 105 to drive deflection of liquid crystal molecules in the display device, thereby performing the image display; in a touch stage, the touch electrodes TX are used to detect the touch positions. It should be understood that the pixel circuit shown in FIG. 2A is only for illustration, and the present disclosure is not limited thereto.

Figure 5A:
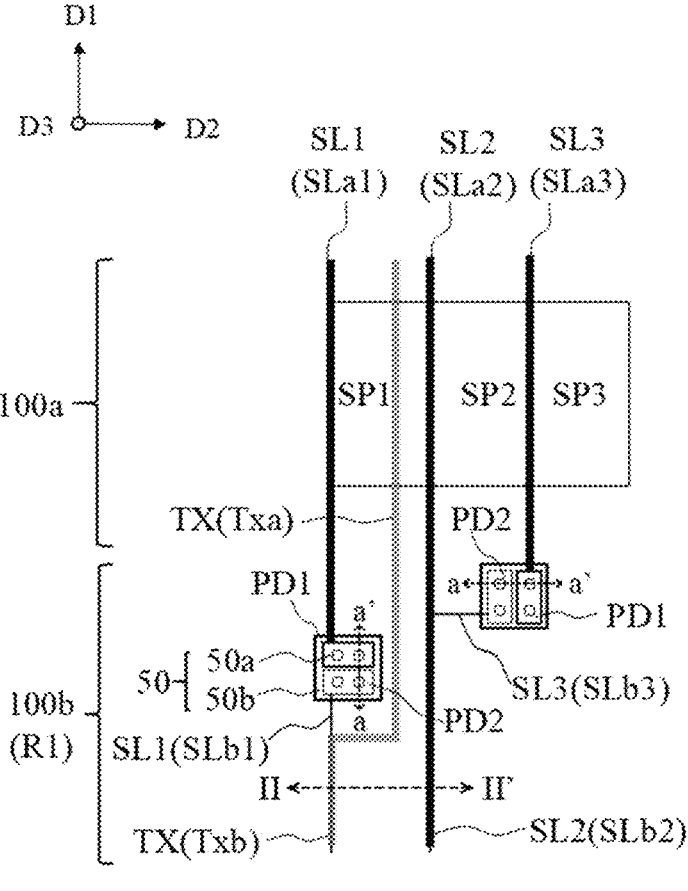
FIG. 5A to FIG. 5F are schematic views illustrating wiring of touch signal lines and data signal lines in some embodiments of the present disclosure.

Still referring to FIG. 1 and FIG. 2A, in some embodiments, each of the data signal lines SL includes a data signal main line SLa located in the display region 100a and a data signal lead wire SLb located in the peripheral region 100b (FIG. 5A). For example, a plurality of data signal main lines SLa extend parallel to each other along the direction D1 and are arranged along the direction D2, and a plurality of data signal lead wires SLb respectively extend in a direction intersecting with the direction D1.

In some embodiments, the touch signal main lines TXa and the data signal main lines SLa extend parallel to each other along the direction D1, and the touch signal main lines TXa and the data signal main lines SLa may be located in the same layer or different layers.

For example, as shown in FIG. 3A, in some embodiments, the touch signal main line TXa and the data signal main line SLa are located in a same conductive layer, and the touch signal main line TXa is disposed on a side of the data signal main line SLa in the direction D2. For example, the touch signal line TX extends across a sub-pixel region and is located between adjacent data signal main lines SLa.

In some embodiments, the gate lines GL are disposed over the substrate 80. Although it is shown in FIG. 3A that the gate line GL is directly on the substrate 80 and in contact with the substrate 80, but this is only for illustration, and the present disclosure is not limited thereto. For example, other device layer(s) or intermediate layer(s) (not shown) may be further disposed between the substrate 80 and the gate line GL, so that the gate line GL is not in direct contact with the substrate 80. In some embodiments, the data signal main line SLa and the touch signal main line TXa are disposed in a conductive layer different from the conductive layer where the gate line GL is located, for example, the data signal main line SLa and the touch signal main line TXa are disposed above the gate line GL and located in a same conductive layer. Herein, different conductive layers refer to conductive layers formed on the surfaces of different insulating layers or embedded in different insulating layers, for example, the different conductive layers are formed by different patterning processes, in some embodiments, top surfaces of the different conductive layers or bottom surfaces of the different conductive layers are located at different level heights relative to the main surface (for example, top surface) of the substrate 80, but the present disclosure is not limited thereto; the same conductive layer refers to a conductive layer formed on a surface of a same insulating layer or embedded in a same insulating layer, some or all of conductive features in the same conductive layer are formed, for example, by a same patterning process on a same conductive material layer. In some embodiments, top surfaces or bottom surfaces of multiple conductive features in the same conductive layer may be located at substantially a same level height relative to the main surface of the substrate 80, but the present disclosure is not limited thereto. In another embodiment, the top surfaces or the bottom surfaces of multiple conductive features in the same conductive layer may be at different level heights. It should be understood that, the same conductive layer may include a plurality of conductive features, and whether the plurality of conductive features are electrically connected or isolated from each other is not limited in the disclosure.

In some embodiments, the gate lines GL are located in the conductive layer M1, and the data signal main lines SLa and the touch signal main lines TXa are located in the conductive layer M2. The conductive layer M1 where the gate lines GL are located may also be called a gate layer, and the conductive layer M2 where the data signal main lines SLa are located may also be referred to as a source/drain (S/D) layer. The insulating layer 103 is disposed between the conductive layer M1 and the conductive layer M2 to separate the conductive layer M1 and the conductive layer M2 apart from each other. In some embodiments, the conductive layer M2 is located above the conductive layer M1, that is, the conductive layer M2 is located on a side of the conductive layer M1 away from the substrate 80, but the present disclosure is not limited thereto. In some other embodiments, the conductive layer M2 may also be disposed under the conductive layer M1, that is, the conductive layer M2 is located on a side of the conductive layer M1 close to the substrate 80. In some embodiments, the data signal main line SLa and the touch signal main line TXa are spaced apart from each other in the direction D2, and the insulating layer 106 may be disposed between the data signal main line SLa and the touch signal main line TXa that are adjacent to each other, so that the adjacent data signal main line SLa and touch signal main line TXa are electrically isolated from each other. In some embodiments, the pixel electrodes 105 (FIG. 2A) are also disposed in the conductive layer M2, but the present disclosure is not limited thereto. In some other embodiments, the pixel electrodes 105 and the data signal main lines SLa may also be disposed in different layers. The touch electrodes 108 are disposed opposite to the pixel electrodes 105, for example, disposed above the pixel electrodes 105, that is, on a side of the pixel electrodes 105 away from the substrate 80, but the present disclosure is not limited thereto. The insulating layer 106 is further disposed between the pixel electrodes 105 and the data signal main lines SLa and/or between the pixel electrodes 105 and the touch signal main lines TXa, and between the conductive layer M2 and the touch electrodes 108.

Figure 2B:
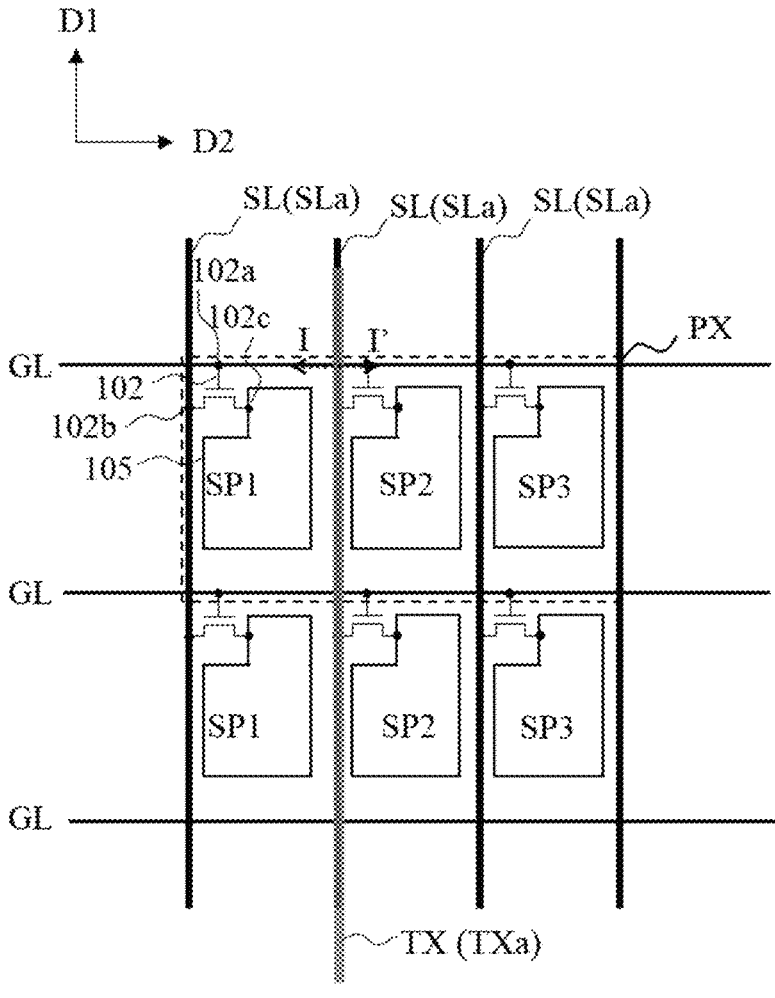
FIG. 2B illustrates a schematic view of the region A in the display region of the touch display device shown in FIG. 1 according to some other embodiments of the present disclosure.
Figure 3B:
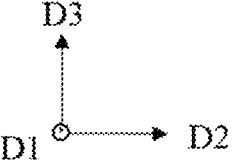
FIG. 3B illustrates a schematic cross-sectional view taken along a line I-I' of FIG. 2B according to some other embodiments of the present disclosure.
Figure 3B:
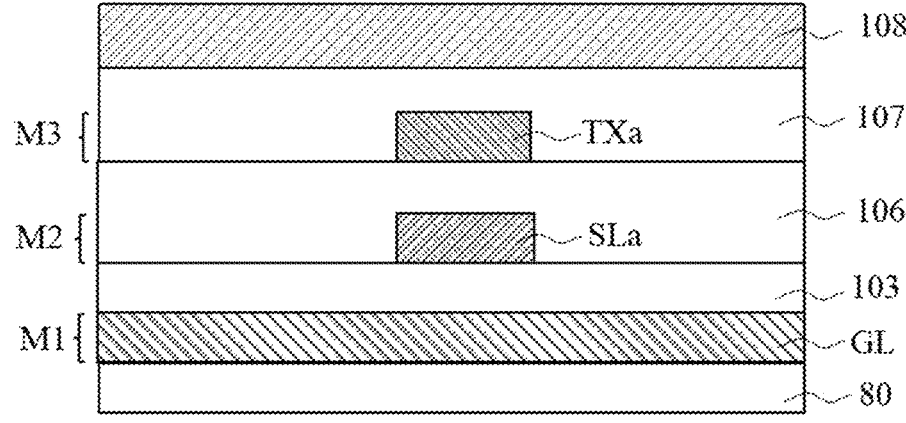

FIG. 2B illustrates a schematic view of a region A in the display region of the display device 100 shown in FIG. 1 according to some other embodiments of the present disclosure. FIG. 3B illustrates a schematic cross-sectional view taken along a line I-I' of FIG. 2B according to other embodiments of the present disclosure.

Referring to FIG. 2B and FIG. 3B, in some other embodiments, the data signal main line SLa and the touch signal main line TXa are disposed in different conductive layers. In the present embodiment, the data signal main line SLa and the touch signal main line TXa may be overlapped (e.g., partially overlapped or completely overlapped) with each other in a direction D3 perpendicular to the substrate 80. In an alternative embodiment, the data signal main line SLa and the touch signal main line TXa may also be disposed in different layers but are not overlapped with each other, and are disposed adjacent to each other in the direction D2 parallel to the substrate 80. For example, the gate line GL is disposed in the conductive layer M1, and the data signal main line SLa is disposed in the conductive layer M2, while the touch signal main line TXa is disposed in a conductive layer M3 which is different from the conductive layer M1 and the conductive layer M2. In some embodiments, the conductive layer M3 where the touch signal main line TXa is located may be disposed above the conductive layer M1 and the conductive layer M2, that is, on a side of the conductive layer M1 and the conductive layer M2 away from the substrate 80, and the conductive layer M3 is disposed between the conductive layer M2 and the touch electrodes 108. In the present embodiment, an insulating layer 107 is further disposed on the insulating layer 106, the insulation layer 107 covers surfaces of the touch signal main line TXa and is disposed between the touch signal main line TXa and the touch electrode 108. It should be understood that, the positions of the touch signal main line TXa and the conductive layer M3 where the touch signal main line TXa is located shown in FIG. 3B are only for illustration, and the present disclosure is not limited thereto.

Figure 4:
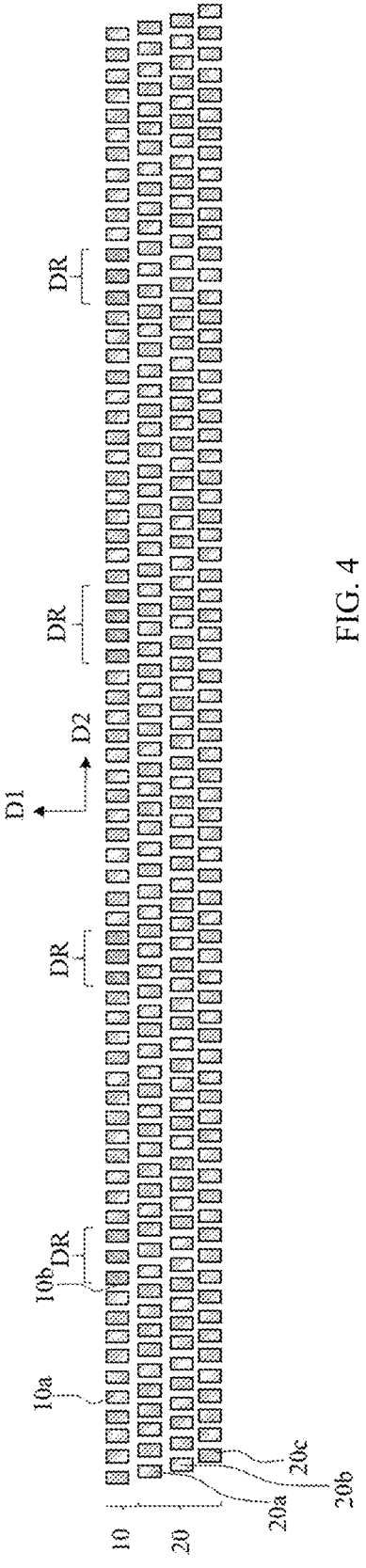
FIG. 4 illustrates a schematic enlarged view of a region B in a peripheral region shown in FIG. 1 according to some embodiments of the present disclosure.

FIG. 4 is an enlarged schematic view of a region B in the peripheral region 100b shown in FIG. 1, and FIG. 4 illustrates a plurality of pins located in the peripheral region according to some embodiments of the present disclosure.

Referring to FIG. 4, in some embodiments, a plurality of pins are disposed in the bonding region of the peripheral region 100b. The plurality of pins may, for example, be or include IC output pins, and the IC output pins are electrically connected to a plurality of data signal lines and a plurality of touch signal lines. For example, a plurality of first pins 10 and a plurality of second pins 20 are disposed along the direction D1 and the direction D2. The plurality of first pins 10 are or include touch pins 10a, for example, and in some embodiments, the plurality of first pins 10 may further include one or more dummy touch pins 10b. The plurality of first pins 10 may be arranged in one or more rows along the direction D2. The plurality of second pins 20 are, for example, data pins, and may be arranged in one or more rows along the direction D2. For example, the plurality of second pins 20 include a plurality of data pins 20a, 20b, and 20c, the plurality of data pins 20a to 20c are respectively arranged in a row in the direction D2, and in the direction D1, the data pins 20a to 20c located in adjacent rows are not completely aligned, for example, are partially overlapped or completely staggered. In some embodiments, the first pins 10 and the second pins 20 (for example, data pins 20a) in adjacent rows are not completely aligned, for example, may be partially overlapped or completely staggered. Such an arrangement can effectively provide wiring space for the signal lead wires connected to the first/second pins, and the overall layout space is saved. It should be understood that, the number of rows of the first pins 10 and the second pins 20 and the number of pins included in each row and the arrangement of the pins shown in FIG. 4 are only for illustration, and the present disclosure is not limited thereto.

Figure 5B:
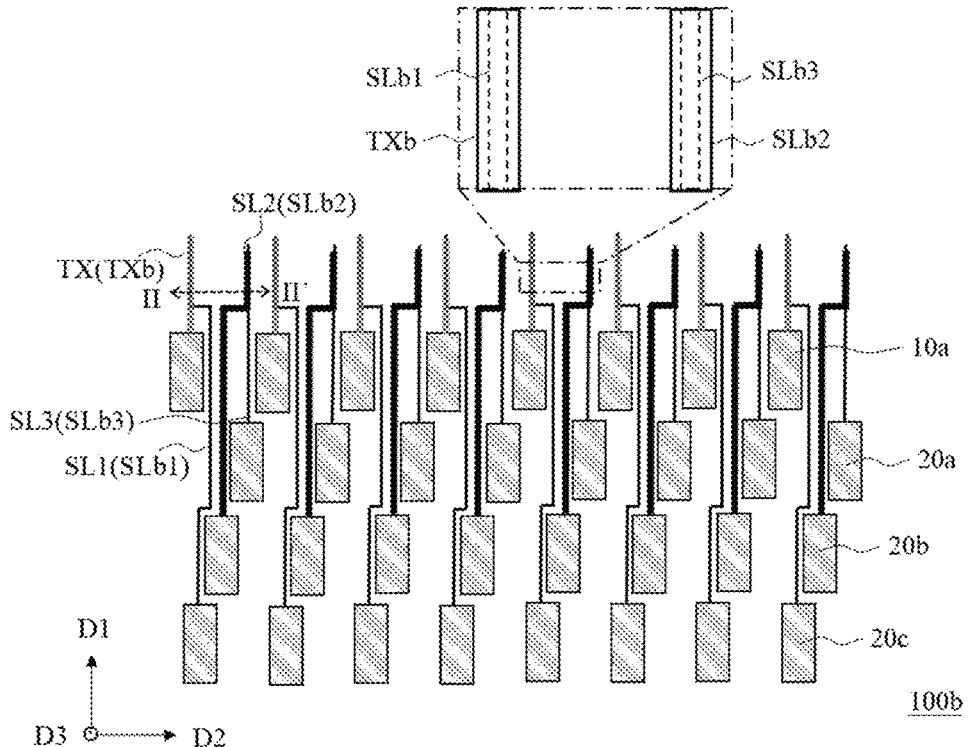

FIG. 5A is a schematic view illustrating wiring of touch signal lines and corresponding data signal lines extending from the display region to the peripheral region according to some embodiments of the present disclosure, for the sake of brevity, FIG. 5A only illustrates one touch signal line and three adjacent corresponding data signal lines and corresponding pixel regions, and it should be understood that other touch signal lines and data signal lines adopt a similar wiring manner. FIG. 5B is a schematic view illustrating partial wiring in the peripheral region of the data signal lines and the touch signal lines shown in FIG. 5A according to some embodiments of the present disclosure, and FIG. 5B schematically illustrates the connection manners of a plurality of touch pins and corresponding signal lead wires and the connection manners of a plurality of data pins and corresponding signal lead wires. For the sake of brevity, FIG. 5B only illustrates some of the plurality of touch pins and the plurality of data pins, it should be understood that other touch/data pins in the peripheral region adopt similar connection manners. In addition, FIG. 5A and FIG. 5B respectively illustrate the wiring manners of the signal lines before they reach the pins in the peripheral region, and the wiring manners of the signal lines after reaching the positions where the pins are located and the connection manners of the signal lines and the pins, it should be understood that the signal lead wires of the respective signal lines continuously extend from the position of the peripheral region 100b close to the display region 100a as shown in FIG. 5A to a pin array of the peripheral region 100b shown in FIG. 5B.

Referring to FIG. 5A and FIG. 5B, in some embodiments, a plurality of touch signal lines TX are respectively connected to corresponding first pins 10 (for example, touch pins 10*a*). Each of the plurality of touch signal lines TX includes a touch signal main line TXa located in the display region 100*a* and a touch signal lead wire TXb located in the peripheral region 100*b*; the touch signal main line TXa and the touch signal lead wire TXb are connected to each other, and the touch signal lead wire TXb is connected to a touch pin 10*a*, so that the touch signal main line TXa is connected to the touch pin 10*a* through the touch signal lead wire TXb. In some embodiments, the touch signal main line TXa and the touch signal lead wire TXb are located in a same conductive layer, and the touch signal main line TXa and the touch signal lead wire TXb are directly connected to each other, without passing through a via. In the present disclosure, two conductive features (for example, the signal main line and the signal lead wire) being directly connected to each other means that the two conductive features do not need to pass through any via to cross to different layers, and may include a case where the two conductive features are connected to each other and extend in a same layer, without other components being interposed between the two conductive features (for example, the two conductive features may be included a continuous wiring line, and there may be no obvious interface between the two conductive features), but may also include another case where the two conductive features are located in a same layer and further connected to other component (for example, the signal main line may be further connected to an electrostatic discharge circuit before being connected to the signal lead wire), or other components are further disposed between the two conductive features.

For example, both the touch signal main line TXa and the touch signal lead wire TXb are located in the conductive layer M2 (for example, the S/D layer) shown in FIG. 3A. In some embodiments, the first pins 10 (for example, the touch pins 10*a*) and the touch signal lines TX are also located in a same conductive layer, that is, the touch signal main lines TXa, the touch signal lead wires TXb and the touch pins 10*a* are all located in the same conductive layer. Such an arrangement can make the touch signal main line TXa, the touch signal lead wire TXb and the touch pin 10*a* be directly connected to each other, without passing through a via. In some embodiments, one touch signal main line TXa may be connected to a corresponding one touch pin 10*a*, that is, the touch signal main lines TXa and the touch pins 10*a* may have a one-to-one connection relationship; in some other embodiments, a plurality of touch signal main lines TXa may be connected to a same one corresponding touch pin 10*a*, that is, the touch signal main lines TXa and the touch pin 10*a* may have a many-to-one connection relationship. In some embodiments, all of the touch signal lines are directly connected to touch pins without passing through vias; that is, there has no touch signal line in which a touch signal main line is connected to a touch signal lead wire through a via. In the traditional technical solution of using a via to connect the touch signal main line and the touch signal lead wire, a conductive material is prone to have a sharp corner at the corner position of the via, which may cause breakage of the conductive material, and reloaded grid may be further caused during display, which affects the display effect. According to the wiring manner of the embodiment of the present disclosure, the touch signal lines are directly connected to the touch pins without passing through vias, and the above-mentioned display problems caused by vias can be avoided. In addition, such a configuration can also reduce the resistance of the touch signal lines, through which the yield rate is effectively improved and the power consumption of the display device is reduced.

Still referring to FIG. 5A and FIG. 5B, a plurality of data signal lines SL are respectively connected to corresponding second pins 20 (for example, data pins). Each of the plurality of data signal lines SL includes a data signal main line located in the display region and a data signal lead wire located in the peripheral region; the data signal main line and the data signal lead wire are connected to each other, the data signal lead wire is connected to the corresponding data pin, and the data signal main line is connected to the corresponding data pin through the data signal lead wire. In some embodiments, some data signal lines respectively include a data signal main line and a data signal lead wire that are located in a same conductive layer, for example, both located in the conductive layer M2, these data signal main lines and data signal lead wires are directly connected to each other, and are directly connected to data pins located in the same conductive layer, for example, without passing through vias. Some other data signal lines respectively include a data signal main line and a data signal lead wire that are located in different conductive layers, and connected to each other through a via structure, that is, these data signal lines extend across different conductive layers. For example, the data signal main lines of such data signal lines may be located in the conductive layer M2, and the data signal lead wires of such data signal lines are located in the conductive layer M1, but the present disclosure is not limited thereto. In the present disclosure, a data signal line including a data signal main line and a data signal lead wire located in the same conductive layer (that is, without a via structure) is referred to as a "same-layer data signal line", and a data signal line including a data signal main line and a data signal lead wire located in different conductive layers (that is, need to be connected through a via structure) is referred to as a "cross-layer data signal line".

For example, as shown in FIG. 5A, the plurality of data signal lines SL may include a data signal line SL1, a data signal line SL2, and a data signal line SL3; the data signal line SL1 includes a data signal main line SLa1 and a data signal lead wire SLb1 connected to each other, the data signal line SL2 includes a data signal main line SLa2 and a data signal lead wire SLb2 connected to each other, and the data signal line SL3 includes a data signal main line SLa3 and a data signal lead wire SLb3 connected to each other; in some embodiments, the data signal line SL2 is a same-layer data signal line, and the data signal main line SLa2 and the data signal lead wire SLb2 of the data signal line SL2 are located in a same conductive layer, and are directly connected to each other, without passing through a via; the data signal line SL1 is a cross-layer data signal line, and the data signal main line SLa1 and the data signal lead wire SLb1 of the data signal line SL1 are respectively located in different conductive layers, and are connected to each other through a via structure 50; the data signal line SL3 is also a cross-layer data signal line, and the data signal main line SLa3 and the data signal lead wire SLb3 of the data signal line SL3 are respectively located in different conductive layers, and are connected to each other through a via structure 50.

Figure 6A:
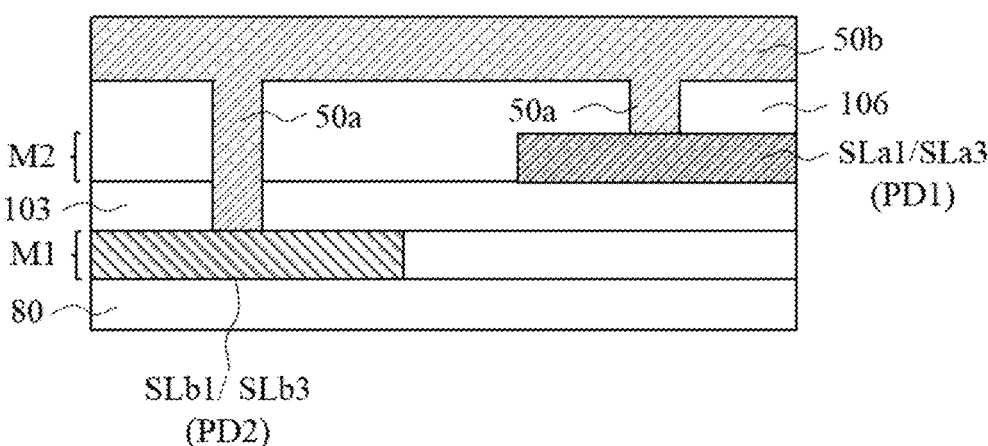
FIG. 6A illustrates a schematic cross-sectional view of a cross-layer data signal line according to some embodiments of the present disclosure.

FIG. 6A schematically illustrates a cross-sectional view of a cross-layer data signal line. FIG. 6A is, for example, a cross-sectional view taken along a line a-a' of FIG. 5A and illustrating a cross-layer data signal line including a via structure.

Referring to FIG. 5A and FIG. 6A, in some embodiments, the cross-layer data signal line includes the data signal main line SLa (e.g., SLa1, SLa3) and data signal lead wire SLb (e.g., SLb1, SLb3) in different conductive layers, and the via structure 50 connecting the data signal main line SLa to the data signal lead wire SLb. In some embodiments, each of the data signal main lines SLa1 and SLa3 has a connection pad PD1, each of the data signal lead wire SLb1 and the data signal lead wire SLb3 has a connection pad PD2; the connection pads PD1 and PD2 of the data signal main line SLa1 and the data signal lead wire SLb1 are respectively connected to a via structure 50 and are connected to each other through the via structure 50; similarly, the connection pads PD1 and PD2 of the data signal main line SLa3 and the data signal lead wire SLb3 are respectively connected to a via structure 50 and are connected to each other through the via structure 50. The via structure 50 may include a suitable conductive material, such as indium tin oxide (ITO). For example, the data signal main line SLa and the data signal lead wire SLb are respectively located in the conductive layer M2 and the conductive layer M1. The insulating layer 103 and the insulating layer 106 are respectively disposed on the conductive layer M2 and the conductive layer M1. The via structure 50 may include one or more conductive vias extending through one or more insulating layers and a conductive cap layer connected to the one or more conductive vias and protruding from the top surface of the insulating layer. For example, the via structure 50 includes a plurality of (for example, four) conductive vias 50a and a conductive cap layer 50b connected to the plurality of conductive vias 50a; some of the conductive vias 50a extend through the insulating layer 106 to be connected to the connection pad PD1 of the data signal main line SLa located in the conductive layer M2; while the other conductive vias 50a extend through the insulating layer 106 and the insulating layer 103 to be connected to the connection pad PD2 of the data signal lead wire SLb located in the conductive layer M1. Therefore, the data signal main line SLa (for example, connection pad thereof) is connected to the conductive cap layer 50b through the conductive via 50a extending through the insulating layer 106, and is connected to the conductive via 50a extending through the insulating layers 106 and 103 by the conductive cap layer 50b, and is further connected to the data signal lead wire SLb (for example, the connection pad thereof) through the conductive via 50a.

In some embodiments, in the display region, the touch signal main line and the data signal main line may be located in a same layer and extend parallel to each other along the direction D1, and are arranged along the direction D2; alternatively, the touch signal main line and the data signal main line may be located in different layers and extend parallel to each other along the direction D1, and may be overlapped with each other in a direction perpendicular to the main surface of the substrate, or may be not overlapped in a direction perpendicular to the main surface of the substrate but are adjacent to each other in a direction parallel to the main surface of the substrate. In the peripheral region, the touch signal lead wire and data signal lead wire may be distributed in the following ways: a touch signal lead wire and a data signal lead located in a different layer than the touch signal lead wire may be regarded as a grouped signal lead wires for wiring, while other data signal lead wires (for example, grouped in pairs) are divided in one or more grouped signal lead wires, each grouped signal lead wires in the above-mentioned grouped signal lead wires includes at least two signal lead wires, which are located in different conductive layers and are overlapped with each other in a direction perpendicular to the main surface of the substrate, or are not overlapped in a direction perpendicular to the main surface of the substrate but are adjacent to each other in a horizontal direction parallel to the main surface of the substrate. For example, herein, two signal lead wires being "adjacent to each other" means that, in the horizontal direction, there has no other signal lead wires disposed between the two signal lead wires. In some examples, a distance between different signal lead wires in a same grouped signal lead wires in the horizontal direction is smaller than a distance between different grouped signal lead wires in the horizontal direction.

Referring to FIG. 5A and FIG. 5B, for example, a plurality of touch signal main lines TXa and a plurality of data signal main lines SLa (e.g., SLa1 to SLa3) are located in a same conductive layer (e.g., the conductive layer M2 shown in FIG. 3A), and the plurality of touch signal main lines TXa and the plurality of data signal main lines SLa extend substantially parallel to each other along the direction D1 and are arranged along the direction D2. In some embodiments, in the peripheral region 100b, the touch signal lead wire TXb and a data signal lead wire (e.g., the data signal lead wire SLb1) which is one of the cross-layer data signal lines (e.g., data signal lines SL1), are served as grouped signal lead wires, and are disposed to be overlapped or partially overlapped with each other in a direction D3 perpendicular to the main surface of the substrate, or disposed to be not overlapped in the direction D3 but adjacent to each other in the direction D2 parallel to the main surface of the substrate; in addition, a data signal lead wire of a same-layer data signal line and a data signal lead wire of a corresponding cross-layer data signal line in the cross-layer data signal lines are regarded as a grouped signal lead wire, and arranged to be overlapped or partially overlapped with each other in the direction D3, or arranged not to be overlapped in the direction D3 but are adjacent to each other in the direction D2, for example, the data signal lead wire SLb2 of the same-layer data signal line SL2 and the data signal lead wire SLb3 of the cross-layer data signal line SL3 are arranged as grouped signal lead wires. Herein, "grouped signal lead wires" include at least two signal lead wires located in different conductive layers, and the at least two signal lead wires are overlapped or partially overlapped in a direction D3 perpendicular to the main surface of the substrate, or are not overlapped in the direction D3 but are adjacent to or close to each other in the direction D2 parallel to the main surface of the substrate. It should be noted that, FIG. 5A and FIG. 5B show grouped signal lead wires that are overlapped with each other, for the clarity of the drawing, thicker signal lines in the figure represent signal lines located at an upper layer, thinner signal lines in the figure represent signal lines located at a lower layer, and a difference in thickness shown in the figure does not represent an actual difference in widths of these signal lines in the direction D2, and the widths of the signal lines in the direction D2 may be the same or different; in addition, in FIG. 5A and FIG. 5B, in an overlapping region of the grouped signal lead wires, the signal lead wire at the lower layer are covered by the signal lead wire at the upper layer and cannot be clearly shown, and the enlarged view in FIG. 5B illustrates the signal lines located at the lower layer with dotted lines, so as to show the overlapping of grouped signal lead wires.

As shown in FIG. 5A and FIG. 5B, some grouped signal lead wires (which may be referred to as first grouped signal lead wires) each include different types of signal lead wires, such as a touch signal lead wire and a data signal lead wire, while some other grouped signal lead wires (which may be referred to as second grouped signal lead wires) each include signal lead wires of the same type, such as two data signal lead wires. In some embodiments where a pin array includes one row of touch pins and three rows of data pins, each first grouped signal lead wires corresponds to a second grouped signal lead wires, but the present disclosure is not limited thereto. In some other embodiments, a row of touch pins corresponds to a row of data pins, and the display device may only include the first grouped signal lead wires, but not include the second grouped signal lead wires; alternatively, each row of touch pins may correspond to two or more rows of data pins, and each of the first grouped signal lead wires may correspond to more than one second grouped signal lead wires. It should be understood that, the number of grouped signal lead wires and the number of signal lead wires included in each grouped signal lead wires shown in FIG. 5A and FIG. 5B are only for illustration, and the present disclosure is not limited thereto. Generally, the touch signal lead wires of the plurality of touch signal lines are respectively arranged with the data signal lead wires of corresponding cross-layer data signal lines to form grouped signal lead wires, and data signal lead wires of a plurality of same-layer data signal lines are respectively arranged with data signal lead wires of corresponding cross-layer data signal lines to form grouped signal lead wires. In some embodiments of the present disclosure, since the plurality of touch signal lines are located at a same layer, the touch signal lines are not routed in pairs with each other, that is, there is no grouped signal lead wires including two touch signal lead wires.

Figure 6B:
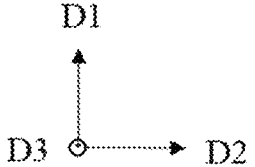
FIG. 6B to FIG. 6D are schematic cross-sectional views taken along a line II-II' of FIG. 5A or FIG. 5B according to some embodiments of the present disclosure.
Figure 6B:
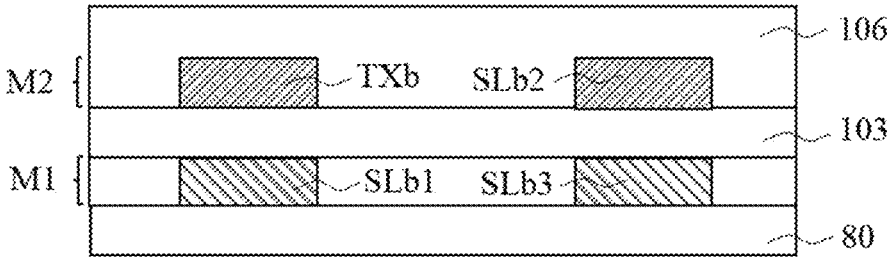
Figure 6C:
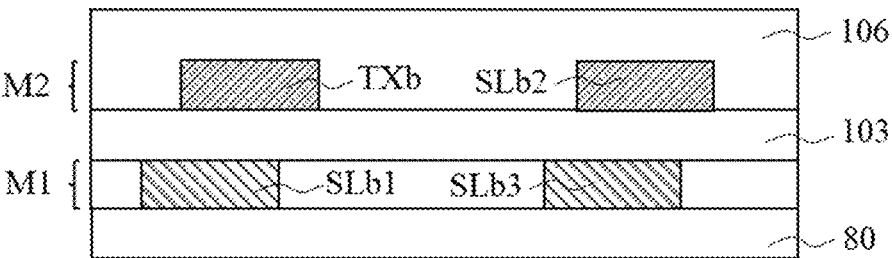
Figure 6D:
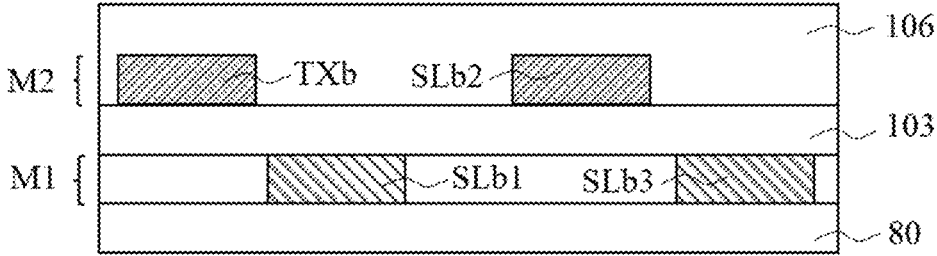

FIG. 6B to FIG. 6D are cross-sectional views taken along a line II-II' of FIG. 5A or FIG. 5B, and schematically illustrate different arrangements of grouped signal lead wires, taking the data signal lead wires SLb1-SLb3 and the touch signal lead wire TXb as an example.

Referring to FIG. 6B, in some embodiments, two signal lead wires included in a grouped signal lead wires (for example, a first grouped signal lead wires including the touch signal lead wire TXb and the data signal lead wire SLb1, a second grouped signal lead wires including the data signal lead wire SLb2 and the data signal lead wire SLb3) are overlapped with each other in a direction (or referred to as a third direction) D3 perpendicular to the substrate 80, such as completely overlapped with each other, that is, an orthogonal projection of the signal lead wire located at the conductive layer M2 in the grouped signal lead wires on the substrate 80 is coincided (e.g., completely coincided) with an orthogonal projection of the signal lead wire located in the conductive layer M1 in the said grouped signal lead wires on the substrate 80. Alternatively, an orthogonal projection of one of the grouped signal lead wires on the substrate 80 is within a range of an orthogonal projection of the other one of the grouped signal lead wires on the substrate 80.

Referring to FIG. 6C, in some embodiments, two signal lead wires included in a grouped signal lead wires (for example, a first grouped signal lead wires including the touch signal lead wire TXb and the data signal lead wire SLb1, a second grouped signal lead wires including the data signal lead wire SLb2 and the data signal lead wire SLb3) are partially overlapped in a direction D3 perpendicular to the substrate 80, that is, an orthogonal projection of the signal lead wire located at the conductive layer M2 in the grouped signal lead wires on the substrate 80 and an orthogonal projection of the signal lead wire located at the conductive layer M1 in the said grouped signal lead wires on the substrate 80 are partially coincided with each other.

Referring to FIG. 6D, in some embodiments, two signal lead wires included in a grouped signal lead wires (for example, a first grouped signal lead wires including the touch signal lead wire TXb and the data signal lead wire SLb1, a second grouped signal lead wires including the data signal lead wire SLb2 and the data signal lead wire SLb3) are not overlapped with each other in a direction D3 perpendicular to the main surface of the substrate 80, but the two signal lead wires are adjacent to or close to each other in a direction D2 parallel to the main surface of the substrate 80. That is, an orthogonal projection of the signal lead wires at the conductive layer M2 in the grouped signal lead wires on the substrate 80 and an orthogonal projection of the signal lead wire at the conductive layer M1 in the said grouped signal lead wires on the substrate 80 are not coincided with each other, and the orthogonal projections of the above two signal lead wires may be spaced apart from each other but very close to each other, or the orthogonal projections of the two signal lead wires may be in contact with each other (that is, a spacing distance thereof in the direction D2 is zero). Herein, "two signal lead wires in a grouped signal lead wires are adjacent to or close to each other in the direction D2" means that a distance between the respective one of the two signal lead wires to the other one of the two signal lead wires in the direction D2 is smaller than a distance between the respective one of the two signal lead wires to other signal lead wires other than the grouped signal lead wires and located in the same conductive layer as the other one of two signal lead wires in the direction D2. That is, each signal lead wire in the conductive layer M2 and a signal lead wire in the conductive layer M1 closest thereto in the direction D2 are routed as grouped signal lead wires. Herein, each of the signal lead wires has a first sidewall (for example, a sidewall on the left side in the figure) and a second sidewall (for example, a sidewall on the right side in the figure) opposite to each other in the direction D2, and a distance between the two signal lead wires in the direction D2 refers to a distance (or referred to as a first distance) between a first sidewall of a first signal lead wire and a first sidewall of a second signal lead wire in the direction D2, or a distance (or referred to as a second distance) between a second sidewall of the first signal lead wire and a second sidewall of the second signal lead wire in the direction D2, or a distance (or referred to as a spacing distance) between the second sidewall of the first signal lead wire and the first sidewall of the second signal lead wire.

For example, the touch signal lead wire TXb and the data signal lead wire SLb1 are wired as a grouped signal lead wires G1, the data signal lead wire SLb2 and the data signal lead wire SLb3 are wired as a grouped signal lead wires G2; the touch signal lead wire TXb and the data signal lead wire SLb1 are not overlapped in the direction D3 perpendicular to the substrate 80 and are adjacent to or close to each other in the direction D2, the data signal lead wire SLb2 and the data signal lead wire SLb3 are not overlapped in the direction D3 perpendicular to the substrate 80 and are adjacent to or close to each other in the direction D2. In some embodiments, the data signal lead wire SLb1 in the grouped signal lead wires G1 is the signal lead wire closest to the touch signal lead wire TXb in the conductive layer M2 in the direction D2 among all the signal lead wires in the conductive layer M1, that is, the distance (or spacing distance) in the direction D2 between the touch signal lead wire TXb and the data signal lead wire SLb1 in the grouped signal lead wires G1 is smaller than the distance (or spacing distance) in the direction D2 between the touch signal lead wire TXb and other data signal lead wires (for example, the data signal lead wire SLb3) in the conductive layer M1 other than the grouped signal lead wires G1. Similarly, the data signal lead wire SLb3 in the grouped signal lead wires G2 is the signal lead wire closest to the data signal lead wire SLb2 located in the conductive layer M2 in the direction D2 among all the signal lead wires located in the conductive layer M1, that is, a distance (or spacing distance) in the direction D2 between the data signal lead wire SLb2 and the data signal lead wire SLb3 in the grouped signal lead wires G2 is smaller than a distance (or spacing distance) in the direction D2 between the data signal lead wire SLb2 and other data signal lead wires (for example, the data signal lead wire SLb1) located in the conductive layer M1 other than the grouped signal lead wires G2. It should be understood that, in a case that the distances of the two grouped signal lead wires are compared, the distances of the same type are used for comparison, for example, the first distances of the signal lead wires are used for comparison, or the second distances of the signal lead wires are used for comparison, or the spacing distances of signal lead wires are used for comparison.

It should be understood that, although only two grouped signal lead wires are shown in FIG. 6B to FIG. 6D, and that the different grouped signal lead wires (that is, the first and second grouped signal lead wires) shown in the figures have similar overlapping manners, but the present disclosure is not limited thereto. Depending on product requirements, a display device may include more grouped signal lead wires, and different grouped signal lead wires may adopt different overlapping manners, each grouped signal lead wires may be arranged in any one of the above three overlapping manners by adjusting the wiring mode of the signal lead wires according to needs. For example, a plurality of first and/or second grouped signal lead wires are provided on substrate 80, each of the plurality of grouped signal lead wires may adopt any of the arrangements described above with reference to FIG. 6B to FIG. 6D.

Referring back to FIG. 5A and FIG. 5B, a plurality of signal lead wires in a plurality of grouped signal lead wires are respectively connected to corresponding first pins and second pins. In some embodiments, a plurality of first pins 10 and a plurality of second pins 20 are arranged along the direction D1, the plurality of first pins 10 include a plurality of touch pins 10a arranged in one or more rows along a direction D2 intersecting with the direction D1, the plurality of second pins 20 include a plurality of data pins 20a arranged in one or more rows along the direction D2. It should be understood that, the row number and quantity of the first pins 10 and the second pins 20 shown in the figures are only for illustration, and the present disclosure is not limited thereto. In some embodiments, the plurality of first pins 10 and the plurality of second pins 20 may be arranged in one row along the direction D1, and can also be arranged in an array including multiple rows and multiple columns along the direction D1 and the direction D2.

Referring to FIG. 5B, for example, the first pins 10 may include a plurality of touch pins 10a arranged in a row along the direction D2, and the second pins 20 may include three rows of data pins 20a, 20b, 20c arranged along the direction D1 and the direction D2. That is, one row of touch pins corresponds to three rows of data pins. In some embodiments, pins located in adjacent rows are not aligned with each other in the direction D1, but are staggered, for example, are not overlapped or partially overlapped. For example, the touch pins 10a in the first row and the adjacent data pins 20a in the second row are arranged to be staggered in the direction D1, and the data pins in adjacent rows among the data pins 20a to 20c are arranged to be staggered in the direction D1.

In some embodiments, each touch pin corresponds to three data pins located in different rows, for example, each touch pin is adjacent to the three data pins in the direction D2. For example, as shown in FIG. 5B, each touch pin 10a and the corresponding three data pins 20a, 20b and 20c are disposed in different rows and adjacent to each other in the direction D2. In some embodiments, the data pins 20a to 20c may, for example, be arranged in a staircase shape. For example, as shown in FIG. 5B, the distances between the data pins 20c, 20b, 20a and the touch pin 10a in the direction D2 increase successively. Alternatively, for example, as shown in FIG. 4, the distances between the data pins 20c, 20b, 20a and the touch pin 10a in the direction D2 decrease successively. The data pins and the touch pins each include a first sidewall (e.g., a left sidewall in the figure) and a second sidewall (e.g., a right sidewall in the figure) opposite to each other in the direction D2, and herein, a distance between the data pin and the touch pin in the direction D2 may be defined by a horizontal distance between the first sidewalls of the corresponding data pin and touch pin in the direction D2, or defined by a horizontal distance between the second sidewalls of the corresponding data pin and touch pin in the direction D2. In some embodiments, such an arrangement of the plurality of pins may facilitate wiring of signal lead wires, and space for wiring is saved.

Referring to FIG. 5A to FIG. 5B, in some embodiments, a touch pin and at least one data pin adjacent (e.g., closest) to the touch pin in the direction D2 among the data pins corresponding to the touch pin are regarded as grouped pins, which are respectively connected to the signal lead wires in a first grouped signal lead wires, and other data pins disposed corresponding to the touch pin constitute one or more grouped pins, each grouped pins includes at least two pins adjacent to each other in the direction D2, and the two pins are respectively connected to the signal lead wires of a second grouped signal lead wires. In some embodiments, signal lead wires are connected to the pins in one-to-one correspondence, and a number of the grouped signal lead wires is approximately equal to a number of the grouped pins. For example, as shown in FIG. 5B, in some embodiments in which each touch pin 10a is disposed corresponding to three data pins 20a to 20c, and the distances between the data pins 20c, 20b, 20a and the corresponding touch pin 10a in the direction D2 increase sequentially, the touch pin 10a and the data pin 20c closest thereto in the direction D2 among the three data pins corresponding to the touch pin 10a are served as grouped pins, and are respectively connected to the touch signal lead wire TXb and the data signal lead wire SLb1 in the first grouped signal lead wires, and other data pins disposed corresponding to the touch pin TXb may be grouped in pairs to form grouped data pins, for example, the data pin 20b and the data pin 20a are served as grouped pins, and are respectively connected to the data signal lead wire SLb2 and the data signal lead wire SLb3 in the second grouped signal lead wires. It should be understood that, the two signal lead wires in the above-mentioned grouped signal lead wires are respectively connected to two pins in the peripheral region, and the two signal lead wires are, for example, extending parallel to each other in the same direction and overlapping or adjacent to each other before reaching a first pin of the two pins; while approaching the position close to the first pin, the two signal lead wires may be wired separately (that is, are not overlapped in the direction D3 and are spaced apart from each other in direction D2), one of the two signal lead wires continues to extend in the same direction as above (e.g., the direction D1) to the corresponding first pin, while the other one of the two signal lead wires firstly changes its extension direction to extend to a position that is not overlapped with the one of the two signal lead wires, then continues to extend (e.g., may continue to extend in direction D1) to connect to a second pin. Taking the touch signal lead wire TXb and the data signal lead wire SLb1 as an example, before reaching the touch pin 10a, the touch signal lead wire TXb and the data signal lead wire SLb1 extend parallel to each other along the same direction D1, and are overlapped or adjacent to each other, while approaching the touch pin 10a, the touch signal lead wire TXb continues to extend along the same direction D1 until it is connected to the touch pin 10a, and the data signal lead wire SLb1 firstly changes its extension direction to extend to a position not overlapped with the touch signal lead wire TXb, and bypass the region where the touch pin 10 is located, and then continues to extend (for example, approximately along the direction D1) to connect with the data pin 20c. In some embodiments, as shown in FIG. 5B, the plurality of grouped signal lead wires are respectively wired separately before reaching the first row of pins (e.g., touch pins 10a), and between adjacent pins in the same row in direction D2, the plurality of signal lead wires extend parallel to each other along the direction D1 without being overlapping with each other. However, the above-mentioned wiring method is only for illustration, and the present disclosure is not limited thereto.

In some embodiments, among the data pins corresponding to a same touch pin, two data pins immediately adjacent to each other in the direction D2 are connected to two data signal lead wires located in different conductive layers. Taking the three data pins 20a-20c corresponding to the touch pin 10a as an example, the data signal lead wires SLb3 and SLb2 connected to the data pins 20a and 20b immediately adjacent to each other in the direction D2 are respectively located in the conductive layers M1 and M2, the data signal lead wires SLb2 and SLb1 connected to the data pins 20b and 20c immediately adjacent to each other in the direction D2 are respectively located in the conductive layers M2 and M1. On the other hand, the data signal lead wires connected to the data pins in the same row corresponding to the plurality of touch pins are located in the same conductive layer. For example, the plurality of data pins 20a in the same row corresponding to the plurality of touch pins 10a are all connected to the data signal lead wires SLb3 in a same conductive layer (e.g., the conductive layer M1), the plurality of data pins 20b in the same row corresponding to the plurality of touch pins 10a are all connected to the data signal lead wires SLb2 in the same conductive layer (e.g., the conductive layer M2), and the plurality of data pins 20c located in the same row corresponding to the plurality of touch pins 10a are all connected to the data signal lead wires SLb1 located in the same conductive layer (e.g., the conductive layer M1).

In the above embodiment, one row of touch pins corresponds to three rows of data pins, and each of the touch pins corresponds to three data pins, in which the touch pin and the data pin adjacent thereto in the second direction are respectively connected to the touch signal lead wire and the data signal lead wire in the first grouped signal lead wires, and the other two data pins are respectively connected to two data signal lead wires in the second grouped signal lead wires. It should be understood that, in other embodiments, one row of touch pins and one row of data pins may also be included, or multiple rows (e.g., two or more rows) of touch pins and multiple rows (e.g., two rows or more than three rows) of data pins may be included, and each of the touch pins and at least one adjacent data pin are respectively connected to the touch signal lead wire and at least one data signal lead wire in a first grouped signal lead wires, while for the other data pins, every at least two data pins adjacent to each other may form a group of grouped data pins, and are respectively connected to at least two data signal lead wires in a second grouped signal lead wires. That is, in the embodiments of the present disclosure, the display device may include one or more groups of grouped signal lead wires each composed of a touch signal lead wire and at least one data signal lead wire, and may further include one or more groups of grouped signal lead wires each composed of at least two data signal lead wires, each of the signal lead wires is connected to a corresponding pin; wherein at least two signal lead wires in each group of the grouped signal lead wires are connected to at least two pins in a grouped pins in a one-to-one correspondence, in which the at least two pins in the grouped pins are, for example, disposed in different rows and adjacent to each other in the direction D2.

Referring back to FIG. 4, in some embodiments, one or more dummy pins are further disposed in the pin array. The dummy pin may be electrically floating. For example, the first pins 10 further include one or more dummy pins 10b. The dummy pin 10b may also be referred to as a dummy touch pin. One or more dummy pins 10b may be disposed aside the touch pins 10a in the direction D2. In some embodiments, in a row of first pins 10, one or more dummy pin regions DR disposed on a side of the touch pins 10a or interposed between a plurality of touch pins 10a in the direction D2 may be included, and each of the dummy pin regions DR may include one dummy pin 10b or a plurality of dummy pins 10b arranged sequentially in the second direction, that is, each single dummy pin region DR does not include a touch pin 10a interposed between the dummy pins 10b. In other words, the number of dummy pins 10b included in each of the dummy pin regions DR is N, and N≥1. In the embodiment where the first pins 10 includes a plurality of dummy pin regions DR, some touch pins 10a are disposed between the dummy pin regions DR. The number of dummy pin(s) 10b included in each of the dummy pin regions DR may be the same or different, and the embodiment of the present disclosure does not limit the number of dummy pin regions DR and the number of dummy pins 10b included in each of the dummy pin regions DR.

Figure 5C:
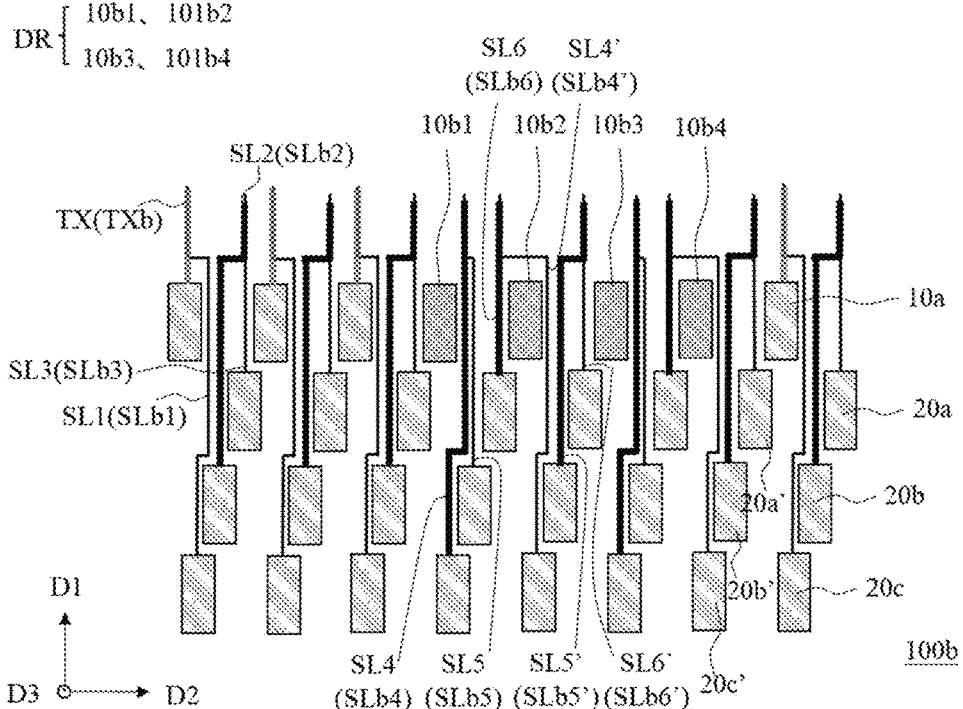

FIG. 5C schematically illustrates the arrangement of corresponding pins and signal lead wires in a case that the number of dummy pins in the dummy pin region is an even number.

Referring to FIG. 5C, in some embodiments, a number N of dummy pins 10b included in a dummy pin region DR is an even number. In the present embodiment, the arrangement/connection manners of the touch pins 10a and the corresponding data pins 20a to 20c and the corresponding signal lead wires are similar to those described above with reference to FIG. 5B, but the arrangement/connection manners of the dummy pins, the corresponding data pins and the corresponding signal lead wires are different. In some embodiments, each dummy pin 10b is arranged corresponding to one or more data pins (e.g., data pins 20a' to 20c') in the second pins 20, for example, a positional relationship between each of the dummy pins 10b and the corresponding data pins 20a' to 20c' may be similar to a positional relationship between the touch pin 10a and the corresponding data pins 20a to 20c. The data pins 20a' to 20c' are disposed in different rows and adjacent to the dummy pin 10b in the direction D2. In some embodiments in which N is an even number, each of the dummy pins in the dummy pin region DR is not connected to a signal lead wire, and the data pins corresponding to the one or more dummy pins in the dummy pin region constitute one or more groups of grouped pins, and are respectively connected to signal lead wires in one or more groups of grouped signal lead wires; wherein each group of the grouped pins includes at least two data pins, and each group of the grouped signal lead wires includes at least two data signal lead wires.

For example, the data pins corresponding to each of the dummy pins are grouped in pairs, and the data pins of each pair are respectively connected to two data signal lead wires in a grouped signal lead wires; in a case where the number of rows of data pins is even, that is, in a case that the number of data pins corresponding to each of the dummy pins is an even number, the data pins corresponding to each of the dummy pins can just be grouped in pairs to form groups of grouped pins, so as to connect with grouped data signal lead wires. In a case that the number of rows of data pins is odd, the data pins corresponding to two adjacent dummy pins are grouped in pairs to form groups of grouped pins (that is, paired data pins), and the pins in each group of the grouped pins are respectively connected to two data signal lead wires in a grouped signal lead wires, in this case, there existed a pair of data pins, in which the two data pins included therein correspond to different dummy pins respectively, for example, some data pins corresponding to an odd-numbered dummy pin (for example, a m-th dummy pin, where m is an odd number) are grouped in pairs, while an unpaired data pin corresponding to the odd-numbered dummy pin and a data pin corresponding to an adjacent even-numbered dummy pin (for example, the (m+1)-th dummy pin) are grouped in pairs to serve as a grouped data pins, and are respectively connected to two data signal lead wires in a grouped data signal lead wires, in this way, the remaining data pins corresponding to the even-numbered dummy pin can just be grouped in pairs. In some embodiments, the odd-numbered dummy pin refers to an odd-numbered dummy pin (e.g., the m-th dummy pin) counted from the dummy pin closest to the touch pin $10a$ along the direction D2, such as counted in the sequence from left to right as shown in the figure in the direction D2; the even-numbered dummy pin refers to an even-numbered dummy pin (e.g., the (m+1)-th dummy pin) counted from the dummy pin closest to the touch pin $10a$ along the direction D2, such as counted in the sequence from left to right as shown in the figure in the direction D2.

For example, as shown in FIG. 5C, in some embodiments, a certain dummy pin region DR includes four dummy pins $10b1$, $10b2$, $10b3$, and $10b4$. The dummy pins $10b1$, $10b2$, $10b3$, and $10b4$ are sequentially arranged from left to right along the direction D2, and may be respectively referred to as a first dummy pin $10b1$, a second dummy pin $10b2$, a third dummy pin $10b3$, and a fourth dummy pin $10b4$. That is, the dummy pins $10b1$ and $10b3$ are odd-numbered dummy pins, the dummy pins $10b2$ and $10b4$ are even-numbered dummy pins. In some embodiments, the second pins 20 include data pins $20a'$, $20b'$, $20c'$ corresponding to each of the dummy pins $10b1$, $10b2$, $10b3$ and $10b4$. The data pins $20a'$, $20b'$, $20c'$ are respectively located in different rows, and are disposed adjacent to the corresponding dummy pin in the direction D2. In some embodiments, the distances between the data pins $20c'$, $20b'$, $20a'$ and the corresponding dummy pin in the direction D2 increase sequentially, and the data pin $20c'$, the data pin $20b'$, and the data pin $20a'$ may also be referred to as a first sub-pin $20c'$, a second sub-pin $20b'$, and a third sub-pin $20a'$ respectively. The data pins and the dummy pins each includes a first sidewall (e.g., the left sidewall shown in the figure) and a second sidewall (e.g., the right sidewall shown in the figure) opposite to each other in the direction D2, and herein, a distance between the data pin and the dummy pin in the direction D2 is defined by a distance between the first sidewall of the data pin and the first sidewall of the corresponding dummy pin in the direction D2, or defined by a distance between the second sidewall of the data pin and the second sidewall of the corresponding dummy pin in the direction D2.

In some embodiments, taking the first dummy pin $10b1$ and the second dummy pin $10b2$ as an example, the data pins $20c'$ and $20b'$ corresponding to the first dummy pin $10b1$ serve as a grouped pins (may be referred to as paired pins here), to be respectively connected to two data signal lead wires SLb4 and SLb5 in a grouped data signal lead wires; the data pin $20a'$ corresponding to the first dummy pin $10b1$ and the data pin $20c'$ corresponding to the second dummy pin $10b2$ served as a paired data pins, to be respectively connected to two data signal lead wires SLb6 and SLb4' in a grouped data signal lead wires; while the data pins $20b'$ and $20a'$ corresponding to the second dummy pin $10b2$ served as a pair of paired data pins, to be respectively connected to two data signal lead wires SLb5' and SLb6' in a grouped data signal lead wires. The arrangement of the data pins and the data signal lead wires corresponding to the dummy pins $10b3$ and $10b4$ is similar to that described above with respect to the dummy pins $10b1$ and $10b2$, which will not be repeated here. It should be understood that the aforementioned "paired pins" refers to two pins that are adjacent to each other in the direction D2 and are respectively connected to two signal lead wires in a grouped signal lead wires.

In some embodiments, a wiring manner of the signal lead wires connected to the data pins corresponding to the dummy pin region is different from a wiring manner of the signal lead wires in the touch pin region. For example, among the grouped data signal lead wires SLb4 and SLb5, the grouped data signal lead wires SLb6 and SLb4', the grouped data signal lead wires SLb5' and SLb6', the data signal lead wires SLb4, SLb6, SLb5' are located in a same conductive layer, such as in the conductive layer M2, while the data signal lead wires SLb5, SLb4', SLb6' are all located in another conductive layer, such as the conductive layer M1 different from the conductive layer M2. That is to say, in some embodiments, among the data pins corresponding to the same dummy pin, two data pins immediately adjacent to each other in the direction D2 are connected to two data signal lead wires located in different conductive layers. Taking the three data pins $20a'$ to $20c'$ corresponding to the dummy pin $10b1$ as an example, the data signal lead wires SLb6 and SLb5 connected to the data pins $20a'$ and $20b'$ immediately adjacent to each other in the direction D2 are located in the conductive layers M2 and M1 respectively, and the data signal lead wires SLb5 and SLb4 connected to the data pins $20b'$ and $20c'$ immediately adjacent to each other in the direction D2 are located in the conductive layers M1 and M2, respectively. On the other hand, among the data pins in a same row corresponding to the plurality of dummy pins, the data signal lead wires connected to two immediately adjacent data pins are located in different conductive layers. For example, the data pin $20a$ corresponding to the dummy pin $10b1$ and the data pin $20a$ corresponding to the dummy pin $10b2$ are located in a same row and adjacent to each other, and are respectively connected to the data signal lead wire SLb6 in the conductive layer M2 and the data signal lead wire SLb6' in the conductive layer M1.

Figure 5D:
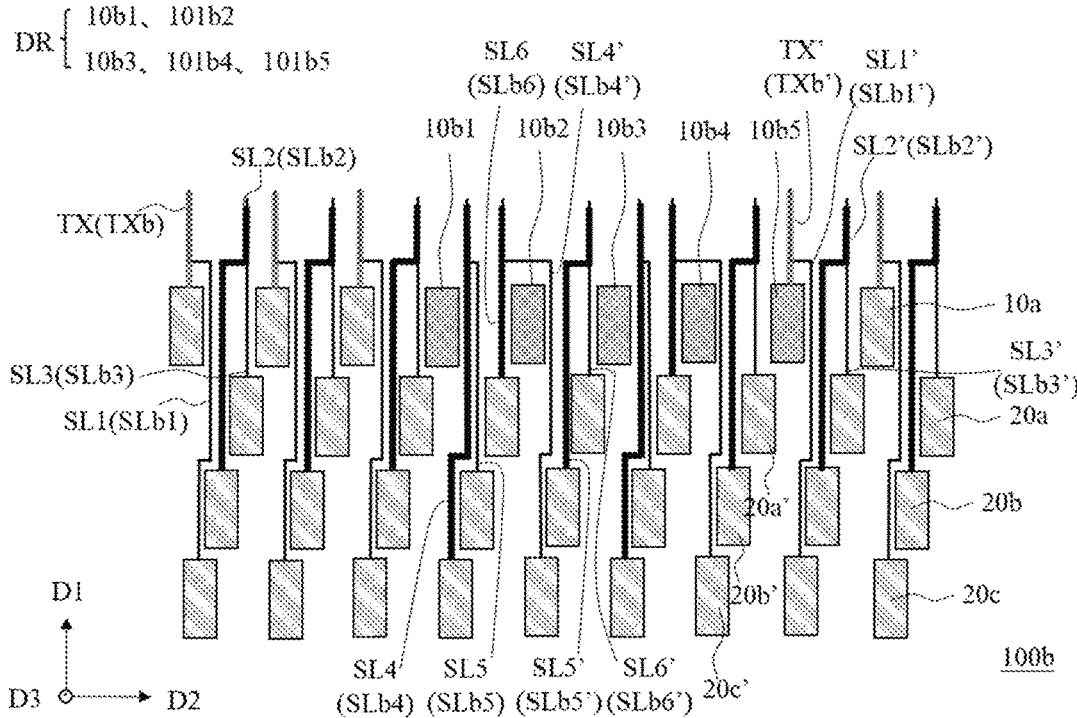
Figure 5E:
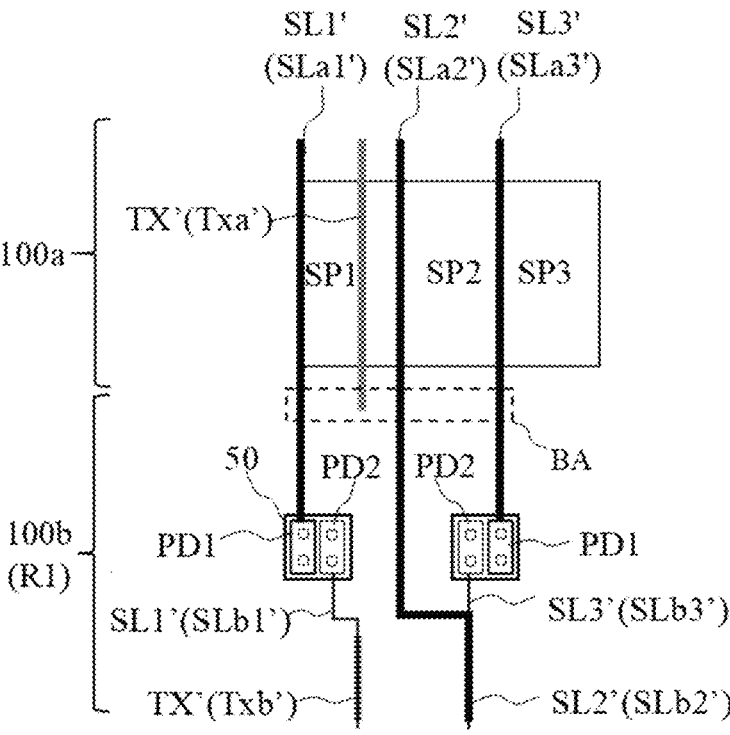

FIG. 5D schematically illustrates the wiring manner of the signal lead wires in the peripheral area when the number N of dummy pins in a certain dummy pin region is an odd number. FIG. 5E schematically illustrates a wiring method of signal lines connected to the N-th dummy pin (counted from left to right in the dummy pin region) and corresponding data pins shown in FIG. 5D in the display region and a peripheral region close to the display region.

Referring to FIG. 5D, in some embodiments, in a case that the number N of dummy pins included in the dummy pin region DR is an odd number, the N-th (i.e., the last odd-numbered) dummy pin counted from left to right in the direction D2 is connected to a dummy touch signal lead wire of a dummy touch signal line, and the wiring method of the signal lead wires connected to the said dummy pin and the corresponding data pins are similar to the wiring method of the signal lead wires connected to the touch pin and the corresponding data pins. In a case that N≥3, a wiring method of signal lead wires connected to a plurality of dummy pins (i.e., the even number of dummy pins) other than the above-mentioned N-th dummy pin and their corresponding data pins is similar to that described with reference to FIG. 5C, which will not be repeated herein. The difference between the wiring method when N is an even number and the wiring method when N is an odd number only lies in that the wiring method of the signal lead wires connected to the last odd-numbered dummy pin counted from left to right and its corresponding data pins is different from the wiring method corresponding to other dummy pins.

As shown in FIG. 5D, in some embodiments, the dummy pin region DR includes an odd number (e.g., 5) of dummy pins 10$b$1, 10$b$2, 10$b$3, 10$b$4 and 10$b$5. The dummy pins 10$b$1, 10$b$2, 10$b$3, 10$b$4 and 10$b$5 are arranged sequentially from left to right in the direction D2 and may be respectively referred to as a first dummy pin 10$b$1, a second dummy pin 10$b$2, a third dummy pin 10$b$3, a fourth dummy pin 10$b$4, and a fifth dummy pin 10$b$5. The connection method of the first to fourth dummy pins 10$b$1 to 10$b$4 and the data pins corresponding to these dummy pins to the corresponding signal lead wires is similar to that described above with reference to FIG. 5C, which is not repeated herein.

Referring to FIG. 5D and FIG. 5E, in some embodiments, a dummy touch signal line TX' is further disposed on the substrate, the dummy touch signal line TX' includes a dummy touch signal main line TXa' disposed in the display region 100$a$ and a dummy touch signal lead wire TXb' disposed in the peripheral region 100$b$. As shown in FIG. 5D, a positional relationship between the dummy touch signal main line TXa' and the adjacent data signal main lines is similar to the aforementioned positional relationship between the touch signal main line TXa and the adjacent data signal main lines. For example, the data signal lines SL1', SL2', SL3' are disposed adjacent to the dummy touch signal main line TX', and the data signal line SL1' includes a data signal main line SLa1' and a data signal lead wire SLb1', the data signal line SL2' includes a data signal main line SLa2' and a data signal lead wire SLb2', the data signal line SL3' includes a data signal main line SLa3' and a data signal lead wire SLb3', the structural features of the data signal lines SL1', SL2', and SL3' are similar to the structural features of the aforementioned data signal lines SL1, SL2, and SL3, which are not repeated herein; the dummy touch signal main line TXa' and the data signal main lines SLa1', SLa2', SLa3' extend in parallel with each other along the direction D1. In some embodiments, the dummy touch signal lead wire TXb' and the data signal lead wire SLb1' are wired as grouped signal lead wires, and the data signal lead wire SLb2' and the data signal lead wire SLb3' are wired as grouped signal lead wires. In addition, different from the touch signal line TX, although the dummy touch signal main line TXa' and the dummy touch signal lead wire TXb' of the dummy touch signal line TX' are located in the same conductive layer, they are disconnected from each other and not connected together. For example, as shown in FIG. 5E, the dummy signal main line TXa' is disconnected (i.e., physically and electrically separated) from the dummy touch signal lead wire TXb' at a position of the display region 100$a$ close to the peripheral region 100$b$. In some embodiments, the dummy touch signal lead wire TXb' is electrically floating.

Referring to FIG. 5D, in some embodiments, the fifth dummy pin 10$b$5 is connected to the dummy touch signal lead wire TXb' of the dummy touch signal line TX', since the dummy touch signal lead wire TXb' is isolated from the dummy touch signal main line TXa', thus the fifth dummy pin 10$65$ is not connected to the dummy touch signal main line TXa'. The fifth dummy pin 10$b$5 is disposed corresponding to the adjacent data pins 20$a$', 20$b$' and 20$c$', the data pins 20$a$', 20$b$' and 20$c$' are disposed along the direction D1 in different rows and adjacent to each other in the direction D2. In some embodiments, the distances of the data pins 20$a$', 20$b$', 20$c$' from the dummy pin 10$b$5 in the direction D2 decrease successively; the dummy touch pin 10$b$5 and the data pin 20$c$' closest to the dummy touch pin 10$b$5 in the direction D2 serve a pair of paired pins, and are respectively connected to the dummy touch signal lead wire TXb' and the data signal lead wire SLb1' that are wired as grouped signal lead wires; the data pins 20$b$' and 20$a$' corresponding to the dummy touch pin 10$b$5 serve as a pair of paired pins, and are respectively connected to the data signal lead wires SLb2' and SLb3' that are wired as grouped signal lead wires. In some embodiments, in a case that a number N of dummy pins included in a dummy pin region is an odd number, through the configuration of the dummy touch signal line and the configurations of the last odd-numbered dummy pin (e.g., the N-th dummy pin counted from left to right in the direction D2, such as the fifth dummy pin 10$b$5 in FIG. 5C) and its corresponding data pins (e.g., data pins 20$a$' to 20$c$') and corresponding signal lead wires, the touch pin 10$a$ adjacent to the last odd-numbered dummy pin and its corresponding data pins can be connected to the corresponding signal lead wires in a same way as other touch pins, which can ensure that the subsequent touch signal lines are directly connected to the touch pins, while the wiring method of the signal lead wires connecting the subsequent touch pins and the corresponding data pins will not be affected, in this way, the layout can be simplified, and wiring space can be saved.

In some embodiments, since dummy pins are disposed in the first pins, and some dummy pins are not connected to signal lead wires, a ratio of a number of all touch signal lines to a number of all data signal lines is smaller than a ratio of a number of row(s) of the first pins to a number of row(s) of the second pins. For example, in the embodiment of FIG. 4 and FIG. 5A to FIG. 5D, the number of row(s) of the first pins 10 is 1, the number of row(s) of the second pins 20 is 3, and the ratio of the number of touch signal lines to the number of data signal lines is less than 1:3.

In some embodiments described above with reference to FIG. 5A to FIG. 5D, the data signal main lines and the touch signal main lines are, for example, located in a same layer in the display region, and the data signal main lines and data signal lead wires of a plurality of signal lines adopt a design of wiring in two conductive layers, but the present disclosure is not limited thereto.

In some other embodiments, the data signal main lines and the touch signal main lines are located in different conductive layers, for example, in the embodiment shown in FIG. 3B, the data signal main line SLa is located in the conductive layer M2, the touch signal main line TXa is located in the conductive layer M3. In these embodiments, the plurality of data signal lines may include same-layer data signal lines and cross-layer data signal lines, the same-layer data signal line include, for example, a data signal main line and a data signal lead wire that are both located in the conductive layer M2, the cross-layer data signal line may include a data signal main line located in the conductive layer M2 and a data signal lead wire located in the conductive layer M1 and a via structure connecting the data signal main line and the data signal lead wire to each other, such a cross-layer data signal line may be referred to as a first cross-layer data signal line; or the cross-layer data signal line may also include a data signal main line located in the conductive layer M2 and a data signal lead wire located in the conductive layer M3 and a via structure connecting the data signal main line and the data signal lead wire to each other, such a cross-layer data signal line may be referred to as a second cross-layer data signal line. That is to say, in these embodiments, the data signal lines adopt a design of wiring in three conductive layers.

In this embodiment, the touch signal line and one data signal line of the same-layer data signal lines may be wired as grouped signal lead wires in both the display region and the peripheral region, that is, the touch signal main line and the touch signal lead wire of the touch signal line located in the conductive layer M3 may be respectively wired as grouped signal lead wires with the data signal main line and the data signal lead wire of the same-layer data signal line located in the conductive layer M2; alternatively, the touch signal line and one data signal line (e.g., the first cross-layer data signal line) of the cross-layer data signal lines may also be wired as a grouped signal lead wires in the peripheral region, for example, in the peripheral region, the touch signal lead wire of the touch signal line located in the conductive layer M3 may be wired as grouped signal lead wires with the data signal lead wire in the conductive layer M1 of the first cross-layer data signal line. The data signal lead wires of other data signal lines may be respectively grouped into groups of signal lead wires for wiring, each group of grouped signal lead wires may include at least two data signal lead wires, for example, one data signal lead wire of a same-layer data signal line and one data signal lead wire of a first cross-layer data signal line may be wired as a group of grouped signal lead wires; or one data signal lead wire of a same-layer data signal line and one data signal lead wire of a second cross-layer data signal line may be wired as grouped signal lead wires; or one data signal lead wire of a first cross-layer signal line and one data signal lead wire of a second cross-layer signal line may be wired as grouped signal lead wires; or one data signal lead wire of a same-layer data signal line, one data signal lead wire of a first cross-layer data signal line and one data signal lead wire of a second cross-layer data signal line may be wired as a group of grouped signal lead wires, that is, this group of the grouped signal lead wires includes three data signal lead wires respectively located in three different conductive layers. In some embodiments, such a wiring design of the touch signal lines and the data signal lines can further save space, and a narrower peripheral region can be realized, furthermore, a narrower lower frame of the display device can be realized.

Figure 5F:
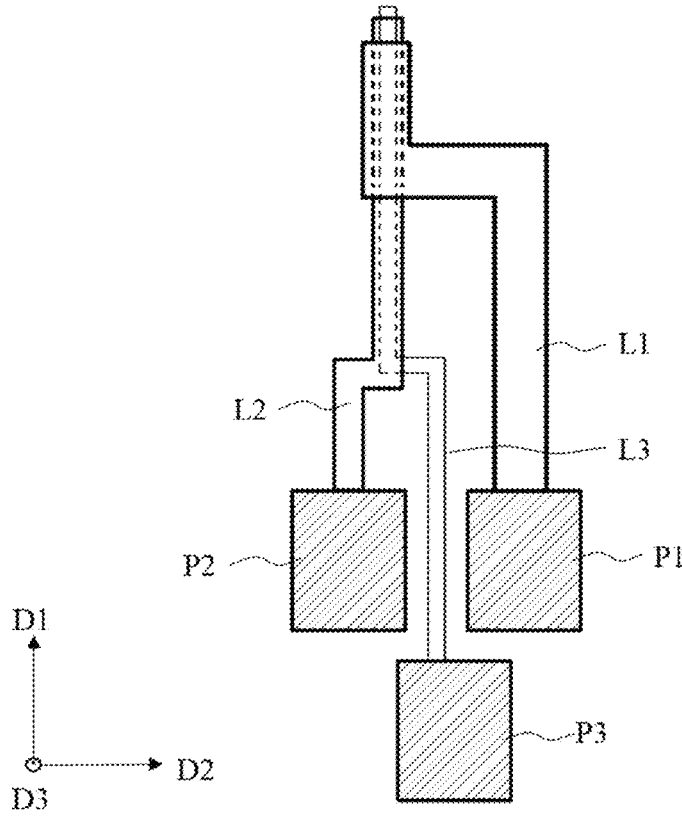

FIG. 5F schematically illustrates the wiring manner of a group of grouped signal lead wires composed of three signal lead wires. Referring to FIG. 5F, in some embodiments, in the peripheral region, three signal lead wires L1, L2, and L3 are respectively located in different conductive layers, and are wired as a group of grouped signal lead wires, overlapping of any two of the three signal lead wires L1 to L3 may be similar to that described with reference to FIG. 6A to FIG. 6D, for example, the three signal lead wires L1 to L3 may be overlapped (e.g., completely overlapped or partially overlapped) with each other in a direction D3 perpendicular to the main surface of the substrate, or are not overlapped but are adjacent to or close to each other in a direction D2 parallel to the main surface of the substrate. In some embodiments, one of the signal lead wires L1 to L3 is a touch signal lead wire, while the other two of the signal lead wires L1 to L3 are data signal lead wires, for example, the signal lead wire L1 is a touch signal lead wire, and the signal lead wires L2 and L3 are data signal lead wires, wherein the touch signal lead wire may be located in the conductive layer M3, one of the signal lead wires L2 and L3 may be a data signal lead wire of a same-layer data signal line, and may be located in the conductive layer M2, and the other one of the signal lead wires L2 and L3 may be a data signal lead wire of a cross-layer data signal line, and may be located in the conductive layer M1, for example, the signal lead wire L2 may be the data signal lead wire of the same-layer data signal line, and the signal lead wire L3 may be the data signal lead wire of a first cross-layer data signal line. In some other embodiments, all of the three signal lead wires L1 to L3 are data signal lead wires, and one of the three signal lead wires L1 to L3 is a data signal lead wire of a same-layer data signal line, while the other two of the three signal lead wires L1 to L3 are data signal lead wires of cross-layer data signal lines, for example, the signal lead wire L2 is the data signal lead wire of the same-layer data signal line located in the conductive layer M2, the signal lead wire L3 is the data signal lead wire located in the conductive layer M1 of a first cross-layer signal line, and the signal lead wire L1 is the data signal lead wire located in the conductive layer M3 of a second cross-layer signal line.

In some embodiments, the signal lead wires L1, L2 and L3 of the grouped signal lead wires are respectively connected to the corresponding pins P1, P2 and P3. It should be understood that, in a case that the signal lead wires are touch signal lead wires, the pins connected to the signal lead wires are corresponding touch pins, in a case that the signal lead wires are data signal lead wires, the corresponding pins connected to the signal lead wires are data pins.

Figure 7A:
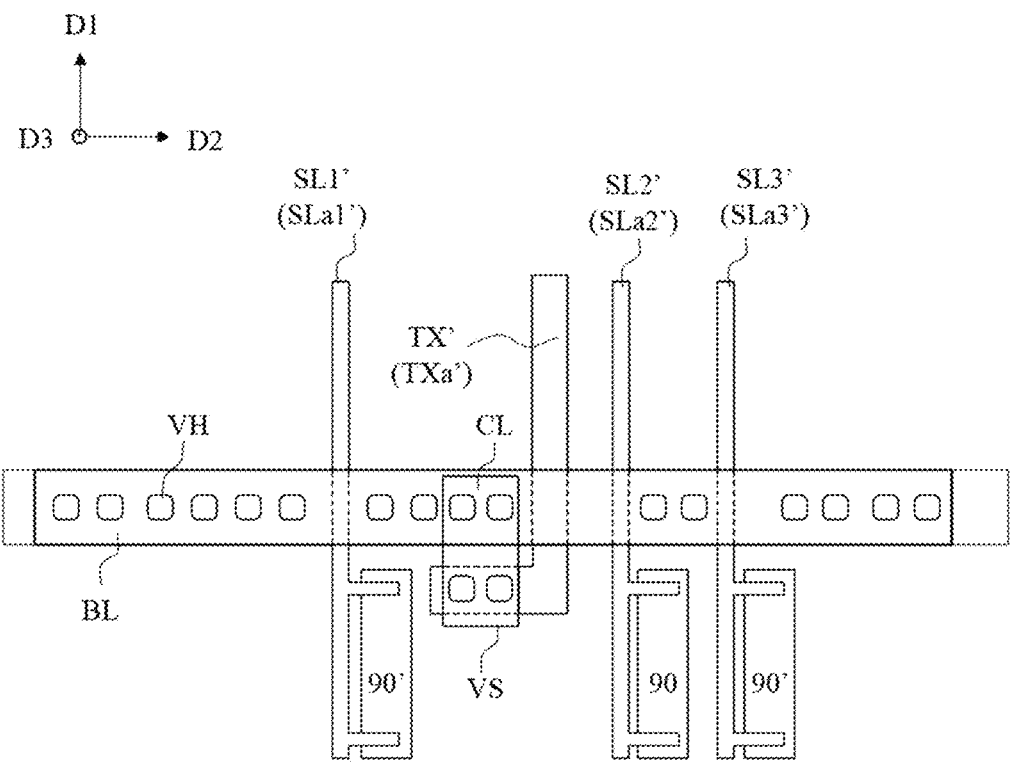
FIG. 7A illustrates a schematic enlarged view of a region BA in FIG. 5E according to some embodiments of the present disclosure.
Figure 7B:
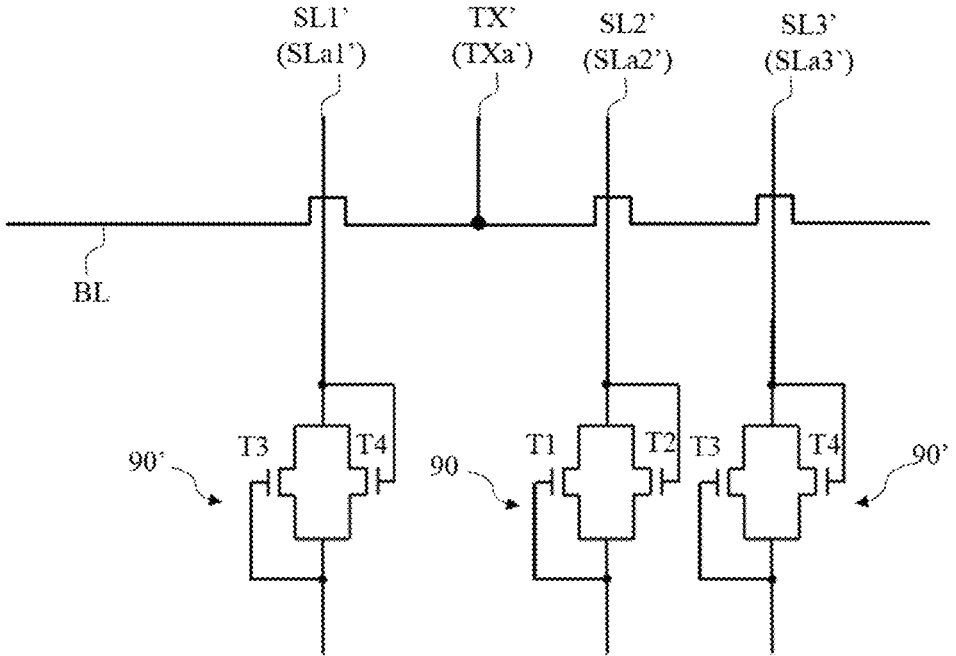
FIG. 7B illustrates an equivalent circuit diagram of the region shown in FIG. 7A.

FIG. 7A illustrates an enlarged schematic view of a region BA in FIG. 5E according to some embodiments of the present disclosure. FIG. 7B illustrates an equivalent circuit diagram of the region shown in FIG. 7A.

Referring to FIG. 5E, in some embodiments, the peripheral region 100b includes a boundary region R1, and the boundary region R1 is disposed on a side of the peripheral region 100b close to the display region 100a, and is located between the display region 100a and a fan-out region of the peripheral region 100b, the region BA is a part of the boundary region R1. The boundary region extends continuously along the direction D2, and is sandwiched between the display region 100a and the peripheral region 100b, in some embodiments, the via structures 50 for realizing the cross-layer wiring of the data signal lines are also disposed in the boundary region R1.

Referring to FIG. 7A, in some embodiments, one or more electrostatic discharge (ESD) units 90 may be disposed in the region BA. The ESD units 90 may be disposed on a side of the via structures 50 close to the display region 100a, but the present disclosure is not limited thereto. For example, the data signal main lines SLa1'-SLa3' are each connected to
a corresponding ESD unit 90 or 90' before extending to the
position of the via structures 50 shown in FIG. 5E. Referring
to FIG. 7B, in some embodiments, the ESD unit 90 includes
an electrostatic discharge circuit including two transistors
T1 and T2, the ESD unit 90' includes an electrostatic
discharge circuit including two transistors T3 and T4, and
the data signal main lines SLa1' to SLa3' are respectively
connected to corresponding electrostatic discharge circuits.
For example, the data signal main lines SLa1' to SLa3' are
respectively connected to the corresponding ESD units 90 or
90' in parallel. Each of the transistors T1 to T4 includes a
first electrode (e.g., a gate electrode G), a second electrode
(e.g., a source electrode S or a drain electrode D) and a third
electrode (e.g., the drain electrode D or the source electrode
S). In some embodiments, in each of the transistors T1 to T4,
the first electrode is connected to one of the second electrode
and the third electrode (e.g., the source electrode S or the
drain electrode D), and one of the second electrode and the
third electrode (e.g., the drain electrode D) is connected to
a low-level signal. In some embodiments, the touch signal
main line of each of the touch signal lines (e.g., the touch
signal main line TXa shown in FIG. 5A) is also connected
to a corresponding ESD unit in the boundary region, the
electrostatic discharge circuit contained in the ESD unit and
a connection manner between the touch signal main line and
the corresponding ESD unit are similar to those described
above with respect to the data signal main line and the ESD
unit 90, which are not repeated herein. It should be under-
stood that, the electrostatic discharge circuit shown in FIG.
7B is only for illustration, and the present disclosure is not
limited thereto. Any suitable electrostatic discharge circuit
may be used in the embodiments of the present disclosure.

Referring to FIG. 7A and FIG. 7B, in some embodiments,
a busline BL is further disposed in the boundary region, and
the busline BL extends along the direction D2, for example,
and may be disposed between the ESD structure 90 and the
display region 100a in the direction D1. In some embodi-
ments, the busline BL is, for example, a common electrode
busline, and is configured to apply a signal to the common
electrode. For example, the busline BL includes a conduc-
tive strip extending along the direction D2, and the conduc-
tive strip is connected to a conductive feature (e.g., a
conductive strip or a conductive block) in another conduc-
tive layer (e.g., the conductive layer M1) through a plurality
of vias VH. In some embodiments, the dummy touch signal
main line TXa' of the dummy touch signal line TX' is
connected to the busline BL through a via structure VS, and
an electrical signal, such as a ground signal, may be applied
to the dummy touch signal main line TXa' through the
busline BL. The via structure VS may include, for example,
one or more vias VH and a conductive layer CL located on
and connected to the vias VH, the conductive layer CL is
connected to the busline BL, so that the dummy touch signal
main line TXa' is connected to the busline BL through the
via VH and the conductive layer CL. In some embodiments,
the conductive strip of the busline BL and the conductive
layer CL are located in a same layer, and may be integrally
formed, for example, that is, there may be no obvious
interface between the conductive strip of the busline BL and
the conductive layer CL, but the present disclosure is not
limited thereto. In some embodiments, the conductive strip
of the busline BL and the conductive layer CL include a
suitable conductive material, such as indium tin oxide (ITO).

Figure 7C:
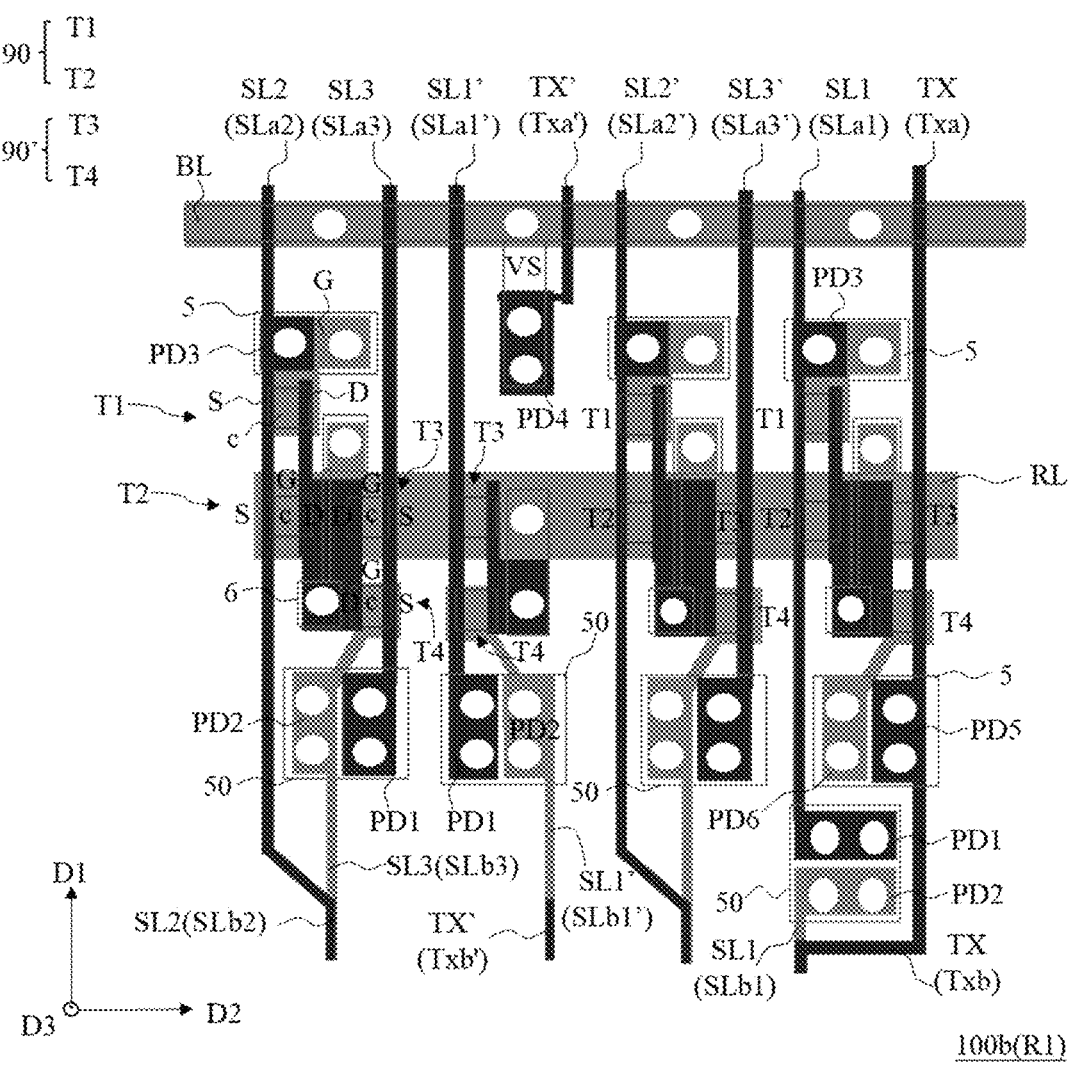
FIG. 7C illustrates a schematic view of a boundary region in FIG. 5A and FIG. 5E according to some embodiments of the present disclosure.

FIG. 7C illustrates a schematic view of a boundary region
between a display region and a fan-out region of the display
device according to some embodiments of the present disclosure, FIG. 7C illustrates schematic views of some other
variation structures corresponding to the boundary region
R1 in FIG. 5A and FIG. 5E, which illustrates positional
relationships of the respective signal lines, the ESD units
and the via structures in an example of the present disclo-
sure.

Referring to FIG. 7C, in some embodiments, each of the
signal lines (e.g., a signal main line) is connected to a
corresponding ESD unit, each of the ESD units includes two
transistors, and a plurality of ESD units are, for example,
disposed in the boundary region between the display region
and the fan-out region in the peripheral region. For example,
the plurality of ESD units may be disposed between the
display region and the via structures of the cross-layer signal
lines, and are disposed between the busline and the via
structures, for example. In some embodiments, at least one
electrode of each transistor in the plurality of ESD units is
connected to an ESD release signal line, the ESD release
signal line may extend along the direction D2, and the ESD
units connected to adjacent signal lines have transistors
disposed on opposite sides of the ESD release signal line in
the direction D1. In addition, the transistors in the ESD units
connected to the adjacent signal lines and the via structure
of the cross-layer signal line in the adjacent signal lines may
be overlapped (for example, completely overlapped or par-
tially overlapped) in the direction D1, that is, the ortho-
graphic projections of the transistors and the via structure on
the ESD release signal line in the direction D1 may be
coincided (for example, completely coincided or partially
coincided) with each other. In the embodiments of the
present disclosure, such an arrangement of the ESD units
and the via structures can reduce the width of these struc-
tures in the direction D2, and space is saved, which in turn
reduces the width of the peripheral region.

As shown in FIG. 7C, for example, the data signal main
lines SLa2 and SLa3 of the data signal lines SL2 and SL3 are
adjacent to each other in the direction D2, and the data signal
lead wires SLb2 and SLb3 of the data signal lines SL2 and
SL3 are wired as grouped signal lead wires. In some
embodiments, in the direction D1, before extending to the
position of or close to the via structure 50 of the cross-layer
data signal line SL3, the data signal main lines SLa2 and
SLa3 are respectively connected to corresponding ESD units
90 and 90', the ESD unit 90 includes transistors T1 and T2,
the ESD unit 90' includes transistors T3 and T4, each of the
transistors T1 to T4 includes a gate electrode G, a source
electrode S and a drain electrode D, and a channel layer c
between the source electrode S and the drain electrode D. An
ESD release signal line RL corresponding to a plurality of
ESD units are further disposed in the peripheral region 100b,
the ESD release signal line RL extends, for example, along
the direction D2, and may be disposed between the busline
BL and the via structure 50 of the cross-layer signal line in
the direction D1; in some embodiments, the ESD release
signal line RL may be multiplexed as gate electrodes of a
plurality of transistors T2 and T3; some portions of the
signal line SLa2 are used as the source electrodes S of the
transistors T1 and T2, some portions of the signal line SLa3
are used as the source electrodes S of the transistors T3 and
T4; in some embodiments, the transistors T1 to T4 may
share a drain layer, and some parts of the drain layer are
respectively used as drain electrodes D of the transistors T1
to T4, and the drain layer is connected to the ESD release
signal line RL through the via structure 6.

In some embodiments, the data signal main line SLa2 has
a connection pad PD3, and a part of the data signal main line
SLa2 is used as the source electrode S of the transistor T1, and connected to the gate electrode G of the transistor T1 through the connection pad PD3 and the via structure 5, the drain electrode D of the transistor T1 is connected to the ESD release signal line through the via structure 6; that is to say, in the transistor T1, the gate electrode G is connected to the source electrode S, and the drain electrode D is connected to the ESD release signal line. In some embodiments, another part of the data signal main line SLa2 is used as the source electrode S of the transistor T2, and a part of the ESD release signal line RL is multiplexed as the gate electrode G of the transistor T2 and is connected to the drain electrode D of the transistor T2 through the via structure 6; that is to say, in the transistor T2, the gate electrode G and the drain electrode D are connected to each other and are connected to the ESD release signal line RL. In some embodiments, for example, in a case that the static electricity of the data signal main line SLa2 accumulates to a certain extent, the positive charges and negative charges accumulated on the data signal main line are released through the transistor T1 and the transistor T2 respectively, so that the electrical level of the data signal main line SLa2 will not be too high or too low.

still referring to FIG. 7C, in some embodiments, a part of the data signal main line SLa3 is used as the source electrode S of the transistor T3, a part of the ESD release signal line RL is multiplexed as the gate electrode G of the transistor T3 and is connected to the drain electrode D of the transistor T3 through the via structure 6; that is to say, in the transistor T3, the gate electrode G and the drain electrode D are connected to each other and are connected to the ESD release signal line RL. Another part of the data signal main line SLa3 is used as the source electrode S of the transistor T4 and is connected to the gate electrode G of the transistor T4 through the connection pads PD1 and PD2 and the via structure 50, the drain electrode D of the transistor T4 is connected to the ESD release signal line through the via structure 6; that is to say, in the transistor T4, the gate electrode G and the source electrode S are connected to each other, and the drain electrode D is connected to the ESD release signal line. The function of the transistor T4 is substantially the same as the function of the transistor T1, and the function of transistor T3 is substantially the same as the function of the transistor T2, which are repeated herein. As shown in FIG. 7C, the connection pad PD2 of the data signal lead wire SLb3 is connected to the gate electrode G of the transistor T4 through a conductive line, that is to say, the connection pads PD1 and PD2 of the data signal line SL3 and the via structure 50 are not only used to connect the data signal main line SLa3 to the data signal lead wire SLb3, but also used to connect the data signal main line SLa3 to the gate electrode G of the transistor T4.

In some embodiments, the transistors T1 to T4 connected to the adjacent data signal main lines SLa2 and SLa3 are located between the display region and the via structure 50 in the direction D1, and are located between the busline BL and the via structure 50 in the peripheral region, for example. The transistor T1 and the transistor T4 may be disposed on opposite sides of the ESD release signal line RL in the direction D1, the transistor T2 and the transistor T3 are disposed along the direction D2 and between the data signal main lines SLa2 and SLa3, and the transistors T2 and T3 are overlapped with the ESD release signal line RL in the direction D3. In some embodiments, the transistors T1 to T4 and the via structure 50 are all disposed between the data signal main lines SLa2 and SLa3 in the direction D2. The via structure 50 is disposed on a side of the plurality of transistors T1 to T4 in the ESD units 90 and 90' away from the display region, and is disposed between the plurality of transistors T1 to T4 and the fan-out region, for example. In some embodiments, the transistors T1 to T4 and the via structure 50 corresponding to the data signal main lines SLa2 and SLa3 adjacent to each other in the direction D2 are overlapped (for example, fully overlapped or partially overlapped) with each other in the direction D1. In other words, orthographic projections of the transistors T1-T4 and the via structure 50 on the ESD release signal line RL in the direction D1 are coincided (e.g., completely coincided or partially coincided) with each other. As shown in FIG. 7C, after the data signal lines SL2 and SL3 pass through the ESD units 90 and 90' and the via structure 50, the data signal lines SL2 and SL3 converge at a side of the via structure 50 close to the fan-out region and are then wired as grouped signal lead wires.

In some embodiments, the connection relationships and position relationships of the data signal main lines SLa2' and SLa3' and the transistors T1 to T4 in the corresponding ESD units 90 and 90' and the via structure 50 are substantially the same as those described above with respect to the data signal main lines SLa2 and SLa3, which are not repeated herein.

In some embodiments, the data signal lead wire SLb1 of the data signal line SL1 and the touch signal lead wire TXb of the touch signal line TX are wired as grouped signal lead wires, and the data signal main line SLa1 and the touch signal main line TXa are arranged adjacent to each other in the direction D2; similar to the data signal main lines SLa2 and SLa3, the data signal main line SLa1 and the touch signal main line TXa are respectively connected to the corresponding ESD unit 90 (including transistors T1 and T2) and the ESD unit 90' (including transistors T3 and T4), a connection relationship between the data signal main line SLa1 and the ESD unit 90 is similar to that described above with respect to the data signal main line SLa2, which will not be repeated herein. The connection relationship between the touch signal main line TXa and the ESD unit 90' is similar to the connection relationship between the data signal main line SLa3 and the ESD unit 90', the difference lies in that some parts of the touch signal line TX (touch signal main line TXa) are respectively used as source electrodes of the transistors T3 and T4, in addition, the touch signal main line TXa has a connection pad PD5, the gate electrode G of the transistor T4 is connected to the connection pad PD6 through a conductive line, the touch signal main line TXa is connected to the gate electrode G of the transistor T4 through the connection pad PD5, the via structure 5 and the connection pad PD6. In this embodiment, the connection pad PD5 and the connection pad PD6 are only used to connect the touch signal main line TXa to the gate electrode G of the transistor T4, and are not used as a via structure for realizing the cross-layer between the touch signal main line TXa and the touch signal lead wire TXb, that is, are not used to connect the touch signal main line TXa to the touch signal lead wire TXb, this is because the touch signal lead wire TXb is directly connected to the touch signal main line TXa, without a need of being connected through a via structure.

In some embodiments, in adjacent data signal main lines corresponding to a second grouped signal lead wires (e.g., adjacent data signal main lines SLa2 and SLa3, adjacent data signal main lines SLa2' and SLa3'), the via structure 50 of the data signal main line (for example, the data signal main line SLa3, SLa3') of the cross-layer data signal line is used as both a connection structure for connecting the data signal main line to the data signal lead wire, and a connection structure for connecting the data signal main line and the gate electrode G of the transistor T4. In some embodiments, the via structures 50 of such data signal lines SL3 and SL3' are disposed at positions close to the transistors T4, and are disposed on a side of the transistors T4 close to the fan-out region, and are arranged in a row and substantially aligned in the direction D2, for example; while in the adjacent data signal main line (e.g., SLa1) and touch signal main line (e.g., TXa) corresponding to the first grouped signal lead wire, the via structure 5 connected to the touch signal main line TXa is disposed at a position close to the transistor T4, and is disposed on a side of the transistor T4 close to the fan-out region, for example, and the via structure 50 for a cross-layer configuration of the data signal main line SLa1 is disposed at a side of the via structure 5 away from the display region and close to the fan-out region.

In this embodiment, the via structure 5 corresponding to the touch signal line TX is disposed between the corresponding ESD unit (e.g., the transistor T4 thereof) connected to the touch signal line TX and the via structure 50 corresponding to the adjacent cross-layer signal line SL1 in the direction D1; in some embodiments, the via structure 5 corresponding to the touch signal line TX is overlapped, and, for example, substantially aligned with the via structures 50 of other non-adjacent cross-layer data signal lines SL3, SL3' in the direction D2, while the via structure 50 of the cross-layer data signal line SL1 is staggered from and not overlapped with the via structures 50 of the cross-layer data signal lines SL3 and SL3' in the direction D2; in some embodiments, the via structure 50 of the data signal line SL1 and the via structure 5 corresponding to the touch signal line TX adjacent to the data signal line SL1 and the transistors T1 to T4 in the corresponding ESD units are disposed between the data signal line SL1 and the touch signal line TX in the direction D2, and are overlapped (e.g., partially overlapped or completely overlapped) with each other in the direction D1, that is, orthographic projections of the via structure 50 of the data signal line SL1 and the via structure 5 corresponding to the adjacent touch signal line TX and the transistors T1 to T4 in the corresponding ESD units on the ESD release signal line RL in the direction D1 are coincided (e.g., partially coincided or completely coincided) with each other.

In some embodiments, in the cross-layer data signal line SL1' and the dummy touch signal line TX', the signal lead wires of the cross-layer data signal line SL1' and the dummy touch signal TX' are wired as grouped signal lead wires in the fan-out region, while in the boundary region, the dummy touch signal main line TXa' is disconnected from the dummy data signal lead wire TXb', and the dummy touch signal main line TXa' is not connected to an ESD unit; in some embodiments, the dummy touch signal main line TXa' has a connection pad PD4, and the dummy touch signal main line TXa' is connected to the busline BL through the connection pad PD4 and the via structure VS. Similar to other cross-layer data signal lines, the data signal main line SLa1' of the cross-layer data signal line SL1' adjacent to the dummy touch signal line TX' is connected to, for example, a corresponding ESD unit 90' including transistors T3 and T4, and is connected to the data signal lead wire SLb1' through the via structure 50. In some embodiments, the via structure 50 of the data signal line SL1' is overlapped with the transistors T3 to T4 of the corresponding ESD unit 90' in the direction D1, and for example, the via structure 50 of the data signal line SL1' is overlapped with the via structure VS corresponding to the dummy touch signal main line TXa' in the direction D1, that is, orthographic projections of the via structure 50 of the data signal line SL1' and the transistors T3 to T4 of the corresponding ESD unit 90' and the via structure VS corresponding to the dummy touch signal main line TXa' on the ESD release signal line RL in the direction D1 may be coincided with each other.

In the embodiments of the present disclosure, through disposing some transistors T1 to T4 in the ESD units connected to adjacent signal lines on two sides of the ESD release signal line RL in the direction D1, and to be overlapped with the via structure 50 in the direction D1, the space can be saved and the area occupied by these components in the direction D2 can be reduced, thereby reducing the width of the peripheral region of the display device.

Figure 8:
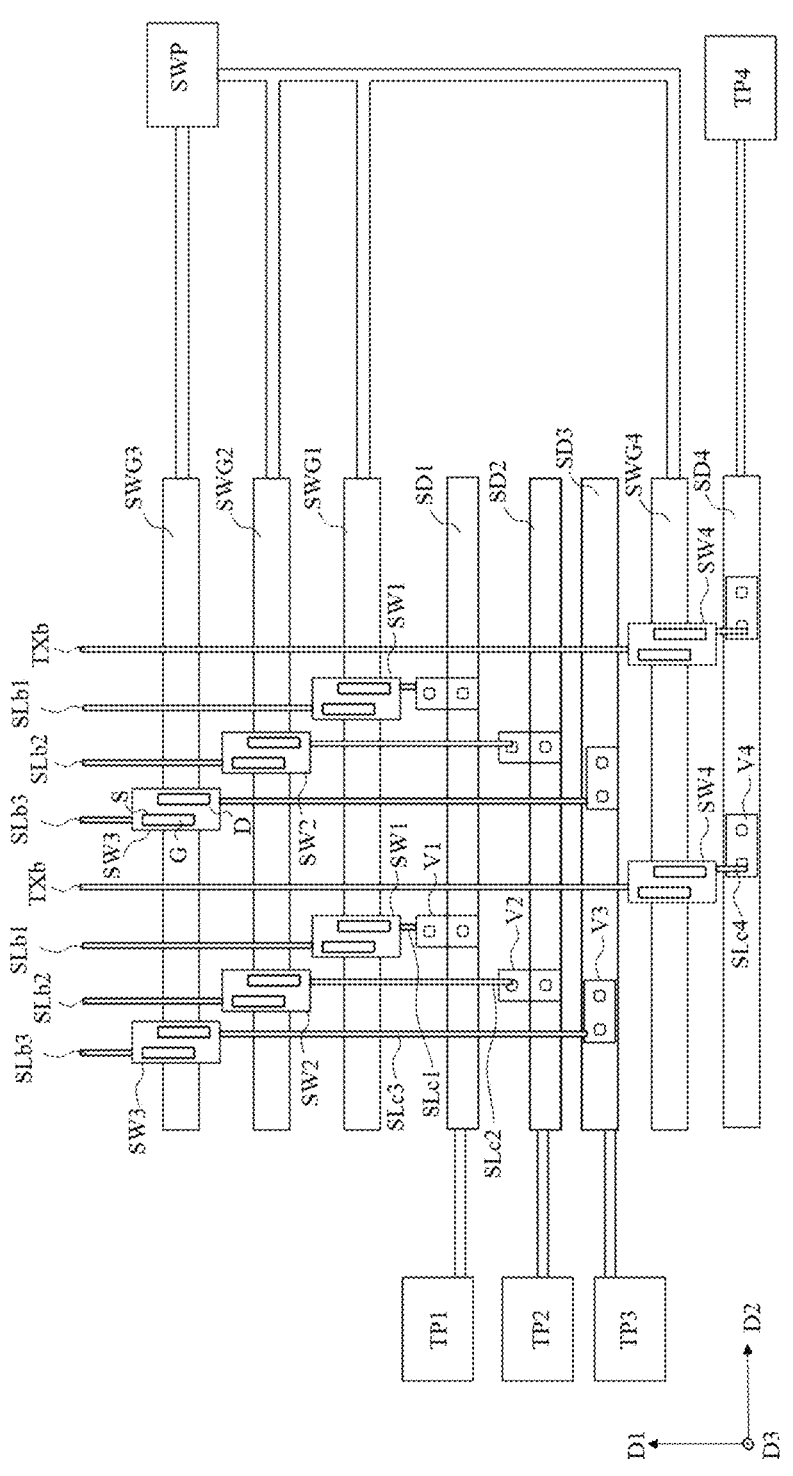
FIG. 8 is a schematic plan view of a test structure of a touch display device according to some embodiments of the present disclosure.

FIG. 8 schematically illustrates a schematic view of a test structure of a touch display device. In some embodiments, an IC bonding region is disposed on a side of the peripheral region away from the display region, and another pin array (for example, including IC input pins) opposite to the pin array shown in FIG. 4 (for example, including IC output pins) is further disposed in the IC bonding region. The input pins (not shown) are, for example, disposed on a side of the output pins away from the display region, and the structure shown in FIG. 8 is, for example, located between the IC output pins and the IC input pins in the direction D1.

Referring to FIG. 8, in some embodiments, after being connected to the pins shown in FIG. 4, the data signal lead wire and the touch signal lead wire continue to extend to be connected to corresponding switching units, and are coupled to corresponding test pads through the switching units, respectively. The test pads and the switching units are coupled to the data signal main lines and the touch signal main lines in the display region through the data signal lead wires and the touch signal lead wires, so that a display test can be realized through the test pads and the switching units during an electrical test.

For example, a plurality of switching units SW1, SW2, SW3 and SW4, a plurality of control signal lines SWG1, SWG2, SWG3, SWG4, a plurality of test signal lines SD1, SD2, SD3, SD4, and a plurality of pads SWP, TP1, TP2, TP3, TP4 are disposed in the peripheral region. Each of the switching units SW1, SW2, SW3 and SW4 may include a gate electrode G, a source electrode S, a drain electrode D, and a channel region between the source electrode S and the drain electrode D. In some embodiments, a plurality of switching units connected to the same type of signal lead wires are arranged in a row along the direction D2; and a plurality of switching units connected to different types of signal lead wires are arranged along the direction D1, and for example, may not be aligned in the direction D1, but are laterally staggered from each other. For example, a plurality of switching units SW1 are respectively connected to a plurality of data signal lead wires SLb1, and are arranged in a row in the direction D2; a plurality of switching units SW2 are respectively connected to a plurality of data signal lead wires SLb2, and are arranged in a row in the direction D2; a plurality of switching units SW3 are respectively connected to a plurality of data signal lead wires SLb3, and are arranged in a row in the direction D2; and the plurality of switching units SW4 are respectively connected to the plurality of touch signal lead wires TXb, and are arranged in a row in the direction D2.

The control signal lines SWG1 to SWG4 and the test signal lines SD1 to SD4 extend parallel to each other along the direction D2, and are arranged along the direction D1. A plurality of control signal lines SWG1 to SWG4 are connected to a pad SWP through conductive lines, for example, are connected to a same pad SWP. The pad SWP may also be referred to as a control pad, and is used to apply a control voltage to the respective switching units through control signal lines, so as to control the switching units to be turned on or not. The test signal lines SD1 to SD4 are respectively connected to the pads TP1 to TP4 through conductive lines. The pads TP1 to TP4 may also be referred to as test pads for applying test signals. In some embodiments, the pads TP1 to TP3 are test pads coupled to the data signal lead wires SLb1 to SLb3 and configured for testing the pixel display, such as for testing the display of blue pixels, green pixels, and red pixels; the pad TP4 is a test pad coupled to the touch signal lead wire TXb and configured for applying a Vcom signal during a display test. In some embodiments, the control signal lines SWG1 to SWG4 are respectively connected to the gate electrodes G of a plurality of switching units SW1 to SW4 in a same row; the data signal lead wires SLb1, SLb2, SLb3 of the data signal lines and the touch signal lead wire TXb of the touch signal line are respectively connected to the source electrodes S of the switching units SW1, SW2, SW3, SW4; the test signal lines SD1 to SD4 are respectively connected to the drain electrodes D of the switching units SW1, SW2, SW3, and SW4, in some embodiments, the test signal lines SD1 to SD4 are located in a conductive layer different from a conductive layer where the source and drain electrodes of the switching units are located, and the test signal lines SD1, SD2, SD3, SD4 may be respectively connected to the drain electrodes D of the corresponding switching units SW1, SW2, SW3, SW4 through via structures V1, V2, V3, V4 and conductive lines SLc1, SLc2, SLc3, SLc4.

During the display test, a control voltage is applied to the respective switching units SW1 to SW4 through the control pad SWP and through the control signal lines SWG1 to SWG4, pixel data signals and the Vcom signal are respectively applied through the test pads TP1 to TP4 and through the signal lines SD1 to SD4, and the pixel display of the display region is further tested through the data signal lines SL1 to SL3 and the touch signal line TX connected to the switching units SW1 to SW4.

In the embodiments of the present disclosure, in the touch display device, the touch signal lines are directly connected to the touch pins without passing through a via, so that crack of the conductive material due to a via can be avoided, and display problems caused by the crack of the conductive material can be further avoided. On the other hand, since the touch signal line is not connected through a via, the resistance of the touch signal line can be reduced, thus the yield rate can be effectively improved, and the power consumption of the product can be reduced. In addition, the touch signal lines and the data signal lines are wired as grouped signal lead wires, as such, the wiring space can be saved. It should be understood that, the above-mentioned wiring methods in the embodiments of the present disclosure not only can be applied to TDDI products, but also can be applied to other types of display devices.

The following points need to be explained:

(1) In the drawings of the embodiment of the present disclosure, only the structures related to the embodiment of the present disclosure are involved, and other structures can refer to the general design.

(2) Without conflict, the features in the same embodiment and different embodiments of the present disclosure can be combined with each other.

The above is only the specific embodiment of the disclosure, but the scope of protection of the disclosure is not limited to this. Any person skilled in the art can easily think of changes or replacements within the scope of the disclosure, which should be covered by the scope of protection of the disclosure. Therefore, the scope of protection of the present disclosure shall be subject to the scope of protection of the claims.

The invention claimed is:

1. A touch display device, comprising:

a display region and a peripheral region, wherein the peripheral region is located on a side of the display region, and first pins and second pins are located in the peripheral region, the first pins comprise a touch pin, and the second pins comprise a first data pin, a second data pin and a third data pin;

a touch signal line and a substrate, wherein the touch signal line is located above the substrate, extending from the display region to the peripheral region, and connected to the touch pin, a portion of the touch signal line located in the display region extends along a first direction;

a first data signal line, extending from the display region to the peripheral region, and connected to the first data pin;

a second data signal line, comprising a second data signal main line located in the display region and a second data signal lead wire located in the peripheral region, wherein the second data signal main line is connected to the second data pin through the second data signal lead wire;

a third data signal line, comprising a third data signal main line located in the display region and a third data signal lead wire located in the peripheral region, wherein the third data signal main line is connected to the third data pin through the third data signal lead wire; and a first electrostatic discharge unit, a second electrostatic discharge unit and an electrostatic discharge signal line that are located in a boundary region of the peripheral region close to the display region, the electrostatic discharge signal line extends along a second direction intersecting the first direction, the second data signal line is connected to the first electrostatic discharge unit, the third data signal line is connected to the second electrostatic discharge unit, wherein each of the first electrostatic discharge unit and the second electrostatic discharge unit comprises a transistor, wherein the third data signal main line and the third data signal lead wire are connected to each other through a via structure, the via structure is also disposed in the boundary region and is disposed on a side of the first electrostatic discharge unit and the second electrostatic discharge unit away from the display region, and at least one transistor of the first electrostatic discharge unit, at least one transistor of the second electrostatic discharge unit, and the via structure are disposed between the second data signal main line and the third data signal main line that are adjacent to each other in the second direction, and are overlapped with each other in the first direction.

2. The touch display device according to claim 1, wherein the touch signal line comprises a touch signal main line and a touch signal lead wire, the touch signal main line is located in the display region and extending along the first direction, the touch signal lead wire is located in the peripheral region and connecting the touch signal main line to the touch pin, and the touch signal main line and the touch signal lead wire are both located in a first conductive layer and are directly connected to each other; and the first data signal line comprises a first data signal main line located in the display region and a first data signal lead wire located in the peripheral region, wherein the first data signal main line is connected to the first data pin through the first data signal lead wire, and the first data signal lead wire is located in a second conductive layer different from the first conductive layer.

3. The touch display device according to claim 2, wherein, in the peripheral region, the touch display device comprises at least one group of first grouped signal lead wires composed of the touch signal lead wire and the first data signal lead wire, the first grouped signal lead wires comprise the touch signal lead wire and the first data signal lead wire being wired to be overlapped with each other in a direction perpendicular to a main surface of the substrate, or comprise the touch signal lead wire and the first data signal lead wire being wired to be not overlapped in the direction perpendicular to the main surface of the substrate, but adjacent to each other in a direction parallel to the main surface of the substrate.

4. The touch display device according to claim 2, wherein the first data signal main line and the first data signal lead wire of the first data signal line are located in a same conductive layer or in different conductive layers, and a data signal main line and a data signal lead wire of at least one of the second data signal line and the third data signal line are located in different layers and connected to each other through a second via structure.

5. The touch display device according to claim 2, further comprising a transistor disposed in the display region and connected to the first data signal line, the transistor comprises a gate electrode and source and drain electrodes, wherein the source and drain electrodes are located in the first conductive layer, and the gate electrode is located in the second conductive layer; or the source and drain electrodes are located in the second conductive layer, and the gate electrode is located in a third conductive layer different from the first conductive layer and the second conductive layer.

6. The touch display device according to claim 2, further comprising a fourth electrostatic discharge unit, and a fifth electrostatic discharge unit that are located in the boundary region of the peripheral region close to the display region, the first data signal line is connected to the fourth electrostatic discharge unit, the touch signal line is connected to the fifth electrostatic discharge unit, wherein each of the fourth electrostatic discharge unit and the fifth electrostatic discharge unit comprises a transistor, and at least one transistor in the fourth electrostatic discharge unit and at least one transistor in the fifth electrostatic discharge unit are disposed on opposite sides of the electrostatic discharge signal line in the first direction.

7. The touch display device according to claim 6, wherein the first data signal main line and the first data signal lead wire of the first data signal line are connected to each other through a first via structure, the first via structure is also disposed in the boundary region and is disposed on a side of the fourth electrostatic discharge unit and the fifth electrostatic discharge unit away from the display region, and the at least one transistor in the fourth electrostatic discharge unit, the at least one transistor in the fifth electrostatic discharge unit, and the first via structure are disposed between the first data signal line and the touch signal line that are adjacent to each other in the second direction, and are overlapped with each other in the first direction.

8. The touch display device according to claim 1, wherein, in the peripheral region, the touch display device comprises at least one group of second grouped signal lead wires composed of the second data signal lead wire and the third data signal lead wire, the second grouped signal lead wires comprise the second data signal lead wire and the third data signal lead wire being wired to be overlapped with each other in a direction perpendicular to a main surface of the substrate, or comprise the second data signal lead wire and the third data signal lead wire being wired to be not overlapped in the direction perpendicular to the main surface of the substrate, but adjacent to each other in a direction parallel to the main surface of the substrate.

9. The touch display device according to claim 1, wherein at least one transistor of the first electrostatic discharge unit and at least one transistor of the second electrostatic discharge unit are disposed on opposite sides of the electrostatic discharge signal line in the first direction.

10. The touch display device according to claim 1, wherein the touch pin, the first data pin, the second data pin and the third data pin are arranged along the first direction, and are disposed adjacent to each other along an arrangement direction intersecting the first direction, wherein distances from the first data pin, the second data pin and the third data pin to the touch pin in the arrangement direction increase sequentially.

11. The touch display device according to claim 1, wherein the first pins comprise a plurality of touch pins arranged in a row along an arrangement direction intersecting the first direction and at least one dummy pin region, each of the at least one dummy pin region comprises a dummy pin or dummy pins, disposed aside the plurality of touch pins in the arrangement direction, a number of the dummy pin or dummy pins comprised in each of the at least one dummy pin region is N, and $N \geq 1$.

12. The touch display device according to claim 11, wherein one of the at least one dummy pin region comprises N dummy pins, wherein N is an even number, wherein the N dummy pins are arranged consecutively in the arrangement direction, and all of the N dummy pins are not connected to signal lead wires.

13. The touch display device according to claim 11, further comprising a dummy touch signal line, the dummy touch signal line comprises a dummy touch signal main line located in the display region and a dummy touch signal lead wire located in the peripheral region, and the dummy touch signal main line and the dummy touch signal lead wire are isolated from each other, wherein the at least one dummy pin region comprises a first dummy pin region, and one dummy pin comprised in the first dummy pin region is connected to the dummy touch signal lead wire.

14. The touch display device according to claim 13, further comprising a fourth data signal line, wherein the second pins further comprise a fourth data pin, the fourth data signal line comprises a fourth data signal main line located in the display region and a fourth data signal lead wire located in the peripheral region, wherein the fourth data signal main line is connected to the fourth data pin through the fourth data signal lead wire, wherein, in the peripheral region, at least one group of grouped signal lead wires constituted by the fourth data signal lead wire and the dummy touch signal lead wire is comprised, the grouped signal lead wires comprise the fourth data signal lead wire and the dummy touch signal lead wire being wired to be overlapped with each other in a direction perpendicular to a main surface of the substrate, or comprise the fourth data signal lead wire and the dummy touch signal lead wire being wired to be not overlapped in the direction perpendicular to the main surface of the substrate, but adjacent to each other in a direction parallel to the main surface of the substrate.

15. The touch display device according to claim 13, wherein a number N of the dummy pin or dummy pins comprised in the first dummy pin region is an odd number, and the one dummy pin is an N-th dummy pin counted from a dummy pin closest to the touch pins along the arrangement direction.

16. The touch display device according to claim 13, further comprising a common electrode busline, wherein the dummy touch signal main line is connected to the common electrode busline.

17. The touch display device according to claim 11, wherein the second pins further comprise a first sub-pin, a second sub-pin and a third sub-pin disposed corresponding to each of the dummy pin or the dummy pins, each of the dummy pin or the dummy pins and the first sub-pin, the second sub-pin and the third sub-pin are arranged along the first direction, and adjacent to each other in the arrangement direction, wherein distances from the first sub-pin, the second sub-pin and the third sub-pin to a corresponding dummy pin increase sequentially in the arrangement direction.

18. The touch display device according to claim 17, wherein the dummy pins comprise a first dummy pin and a second dummy pin adjacent to each other in the arrangement direction, the first sub-pin and the second sub-pin corresponding to the first dummy pin are respectively connected to two data signal lead wires in a third grouped signal lead wires, the third sub-pin corresponding to the first dummy pin and the first sub-pin corresponding to the second dummy pin are respectively connected to two data signal lead wires in a fourth grouped signal lead wires, wherein the two data signal lead wires comprised in each of the third grouped signal lead wires and the fourth grouped signal lead wires are overlapped with each other in a direction perpendicular to a main surface of the substrate, or are not overlapped in the direction perpendicular to the main surface of the substrate but are adjacent to each other in a direction parallel to the main surface of the substrate.

19. The touch display device according to claim 18, wherein the second sub-pin and the third sub-pin corresponding to the second dummy pin are respectively connected to two data signal lead wires in a fifth grouped signal lead wires, the fifth grouped signal lead wires are overlapped with each other in the direction perpendicular to the main surface of the substrate, or the fifth grouped signal lead wires are not overlapped with each other in the direction perpendicular to the main surface of the substrate but are adjacent to each other in the direction parallel to the main surface of the substrate.

20. The touch display device according to claim 18, wherein the first dummy pin is an m-th dummy pin and not an N-th dummy pin counted along the arrangement direction from a dummy pin closest to the touch pins among the dummy pins included in one of the at least one dummy pin region, the second dummy pin is an (m+1)-th dummy pin adjacent to the m-th dummy pin in the arrangement direction, where m is an odd number.

* * * * *